US010834795B2

(12) United States Patent
Zhang et al.

(10) Patent No.: US 10,834,795 B2
(45) Date of Patent: Nov. 10, 2020

(54) BACKLIGHT DRIVE CIRCUIT, BACKLIGHT DRIVING METHOD, AND DISPLAY DEVICE

(71) Applicant: Hisense Visual Technology Co., Ltd., Qingdao (CN)

(72) Inventors: Yuxin Zhang, Qingdao (CN); Junxiong Zhang, Qingdao (CN); Qiang Du, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/256,175

(22) Filed: Jan. 24, 2019

(65) Prior Publication Data
US 2019/0159311 A1    May 23, 2019

Related U.S. Application Data

(63) Continuation of application No. PCT/CN2018/107689, filed on Sep. 26, 2018.

(30) Foreign Application Priority Data

May 16, 2018 (CN) .......................... 2018 1 0467946
May 16, 2018 (CN) .......................... 2018 1 0470297

(51) Int. Cl.
*H05B 33/08* (2020.01)
*H05B 45/46* (2020.01)
(Continued)

(52) U.S. Cl.
CPC ............ *H05B 45/46* (2020.01); *G09G 3/342* (2013.01); *H05B 45/37* (2020.01); *H05B 45/50* (2020.01);
(Continued)

(58) Field of Classification Search
CPC ............ H05B 33/0815; H05B 33/0827; H05B 33/0845; H05B 33/0857; G09G 3/3216; G09G 3/3258; G09G 3/342
(Continued)

(56) References Cited

U.S. PATENT DOCUMENTS 8,659,514 B2    2/2014 Sato et al.
8,878,445 B2 *  11/2014 Takata ................... H05B 45/48
                                                     315/192

(Continued)

FOREIGN PATENT DOCUMENTS

CN    101369407 A    2/2009
CN    102572476 A    7/2012
(Continued)

OTHER PUBLICATIONS

Office Action from Chinese Application No. 201810470297.6 dated Jun. 28, 2018 (8 pages).

*Primary Examiner* — Tung X Le
(74) *Attorney, Agent, or Firm* — Harness, Dickey & Pierce, P.L.C.

(57) ABSTRACT

Disclosed are a backlight drive circuit, a backlight driving method, and a display device. The backlight drive circuit according to some embodiments of the disclosure includes: a plurality of LED strips configured to be powered in a time-division mode; a discharging circuit connected with anodes of the plurality of LED strips; and a first switch element connected with cathodes of the plurality of LED strips, wherein the first switch element has a first terminal connected with the cathodes of the plurality of LED strips, and a second terminal grounded, and the first switch element is configured to be turned on when any one of the plurality of LED strips is powered on.

7 Claims, 18 Drawing Sheets

(51) Int. Cl.
*G09G 3/34* (2006.01)
*H05B 45/37* (2020.01)
*H05B 45/50* (2020.01)

(52) U.S. Cl.
CPC . *G09G 2310/024* (2013.01); *G09G 2320/064* (2013.01)

(58) Field of Classification Search
USPC ......... 315/192, 193, 307, 360; 345/102, 204
See application file for complete search history.

(56) References Cited

U.S. PATENT DOCUMENTS

| | | | |
|---|---|---|---|
| 10,165,633 B2 * | 12/2018 | Furukawa | H05B 45/60 |
| 2006/0017392 A1 | 1/2006 | Park et al. | |
| 2008/0174544 A1 | 7/2008 | Ueda et al. | |
| 2010/0134039 A1 * | 6/2010 | Yu | H05B 45/37 315/291 |
| 2013/0314307 A1 * | 11/2013 | Lin | G09G 3/32 345/82 |
| 2015/0084532 A1 * | 3/2015 | Matsumoto | G09G 3/3216 315/201 |
| 2015/0116635 A1 | 4/2015 | Kanemitsu et al. | |
| 2017/0069270 A1 * | 3/2017 | Hyeon | G09G 3/3216 |
| 2019/0147795 A1 * | 5/2019 | Yao | G09G 3/32 |

FOREIGN PATENT DOCUMENTS

| | | |
|---|---|---|
| CN | 102610196 A | 7/2012 |
| CN | 102982781 A | 3/2013 |
| CN | 202799274 U | 3/2013 |
| CN | 103354086 A | 10/2013 |
| CN | 103747578 A | 4/2014 |
| CN | 103927993 A | 7/2014 |
| CN | 105206230 A | 12/2015 |
| CN | 105654899 A | 6/2016 |
| CN | 206379158 U | 8/2017 |
| JP | 2006011311 A | 1/2006 |
| KR | 20060045807 A | 5/2006 |

* cited by examiner

BACKLIGHT DRIVE CIRCUIT, BACKLIGHT DRIVING METHOD, AND DISPLAY DEVICE

CROSS-REFERENCE TO RELATED APPLICATIONS

This application is a continuation of International Application No. PCT/CN2018/107689 filed Sep. 26, 2018, which claims the benefit of Chinese Patent Application No. 201810470297.6 filed May 16, 2018, and Chinese Patent Application No. 201810467946.7 filed May 16, 2018. The entire disclosures of the above applications are incorporated herein by reference.

FIELD

The present disclosure relates to the field of display technologies, and particularly to a backlight drive circuit, a backlight driving method, and a display device.

BACKGROUND

This section provides background information related to the present disclosure which is not necessarily prior art.

At present, liquid crystal displays have been widely applied to our life, and as the liquid crystal displays are being widely applied, there is a growing demand for higher static contrast of images on the liquid crystal displays, and higher sense of depth in the images.

In the related art, the static contrast of an image on a liquid crystal display, and the sense of depth in the image can be controlled using a backlight control function. As there are a larger number of backlight zones, the static contrast of an image, and the depth of field of the image can be more significantly improved. However as the number of backlight zones is increasing, a more and more sophisticated drive circuit has to be used. In view of this, such a development trend in the field of liquid crystal displays has emerged that the same one drive circuit is shared by a plurality of LED strips in partition backlight source in a time-division multiplexing mode.

SUMMARY

This section provides a general summary of the disclosure, and is not a comprehensive disclosure of its full scope or all of its features.

In the first aspect, some embodiments of the disclosure provide a backlight drive circuit including: a plurality of LED strips configured to be powered in a time-division mode; a discharging circuit connected with anodes of the plurality of LED strips; and a first switch element connected with cathodes of the plurality of LED strips, wherein the first switch element has a first terminal connected with the cathodes of the plurality of LED strips, and a second terminal grounded, and the first switch element is configured to be turned on when any one of the plurality of LED strips is powered on.

In the second aspect, some embodiments of the disclosure provide a backlight drive circuit including:
a backlight source including at least a first LED strip and a second LED strip;
a power supply circuit configured to power the backlight source;
a first switch element arranged between the power supply circuit and the backlight source, wherein the first switch element is configured to control the power supply circuit to power the first LED strip and the second LED strip in a time-division mode;
a second switch element, wherein a first terminal of the second switch element is connected with a cathode of the first LED strip and a cathode of the second LED strip, and a second terminal of the second switch element is grounded, wherein the second switch element is configured to be turned on in response to the power supply circuit powering the first LED strip or the second LED strip; and
a discharging circuit connected with at least an anode of the first LED strip.

In the third aspect, some embodiments of the disclosure provide a display device including the backlight drive circuit according to any one of the above technical solutions of the disclosure.

In the fourth aspect, some embodiments of the disclosure provide a backlight driving method, applicable to a display device including a backlight source and a power supply circuit, wherein the backlight driving method includes: in a first power supply period of time, controlling the power supply circuit to power a first LED strip in the backlight source; after the first power supply period of time elapses, disconnecting the first LED strip from the power supply circuit, and controlling a discharging circuit to discharge the first LED strip in a preset period of time; and after the preset period of time elapses, controlling the power supply circuit to power a second LED strip in the backlight source.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

An architecture and a service scenario to be described in the embodiments of the disclosure are intended to make the technical solutions according to the embodiments of the disclosure more apparent, but not intended to limit the technical solutions according to the embodiments of the disclosure thereto, and those ordinarily skilled in the art can appreciate that the technical solutions according to the embodiments of the disclosure can be equally applicable to a similar technical problem as a new service scenario is emerging.

At present, liquid crystal displays have become common in our life, and have been widely applied to TV sets, computers, mobile phones, and other electronic products; and in order to simplify a sophisticated drive circuit, it is common in the liquid crystal displays to enable the states of LED strips in partition backlight source in the liquid crystal displays using a backlight control function in a time-division multiplexing mode, where there are a plurality of LED strips in the partition backlight source, and the plurality of LED strips share the same one backlight driver, that is, cathodes of the plurality of LED strips are grounded through the same one switch transistor controlled by a backlight driver chip. However while the plurality of LED strips are operating in the time-division multiplexing mode, the plurality of LED strips being powered are switched frequently, and if the LED strips being powered are discharged at a lower speed, then electric charges may remain in several LED strips sharing the drive circuit. Accordingly after an LED strip is powered off, since some electric charges are remained in said LED strip, said LED strip which would otherwise have not been lightened may be slightly lightened while another LED strip is turned on.

Figure 1:
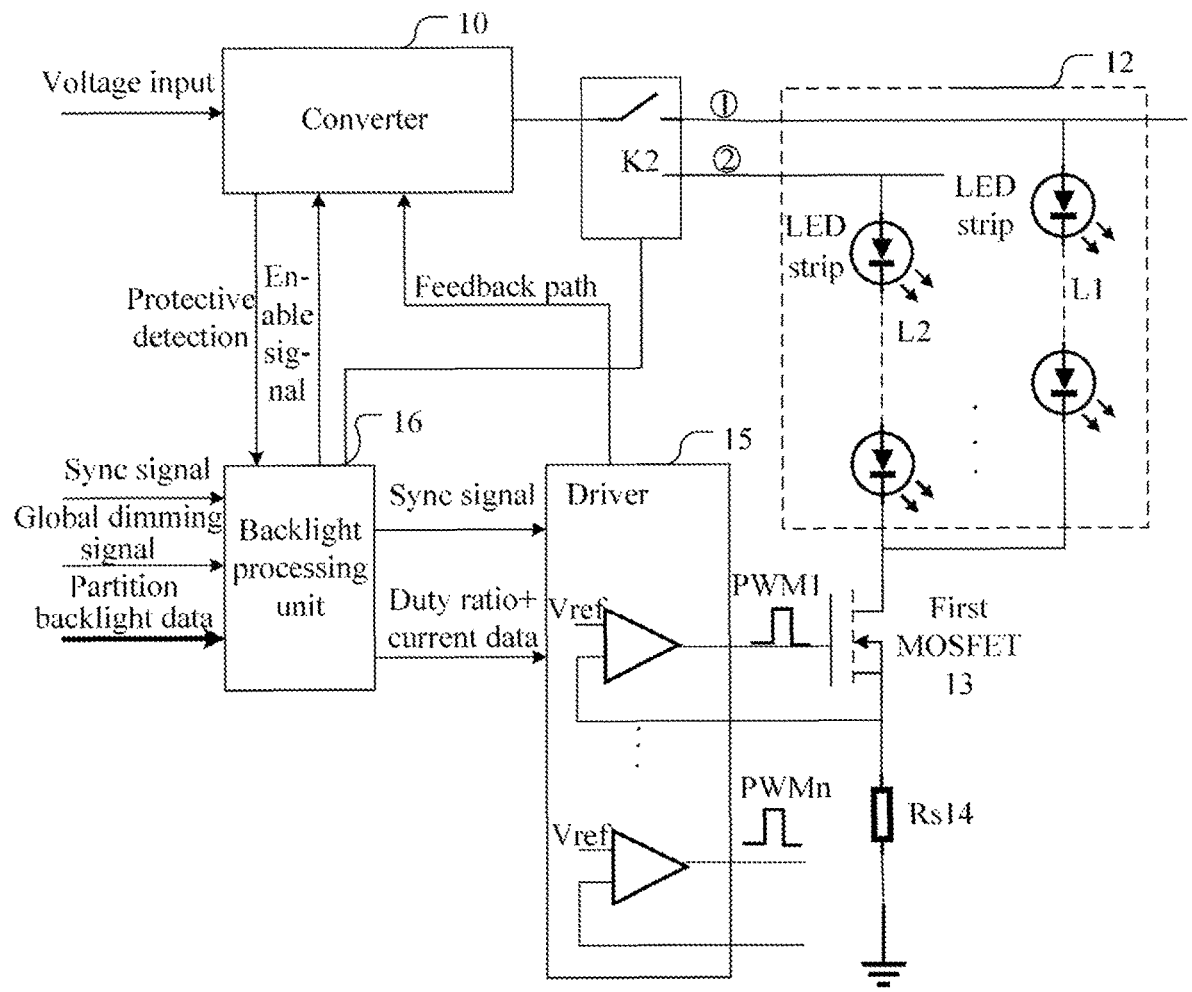
FIG. 1 is a schematic structural diagram of a drive circuit operable in a multi-access time-division multiplexing mode in the related art.

As illustrated in FIG. 1 which is a discharging schematic diagram of a drive circuit operable in a multi-access time-division multiplexing mode in the related art, the drive circuit includes: a converter 10, a second switch K1, a backlight source 12, a first MOSFET 13, a sampling circuit Rs 14, a driver 15, and a backlight processing unit 16.

In some embodiments, a display device includes two or more backlight sources 12, one backlight source corresponding to one image division of the image displayed in the display device, and in another embodiment, the display device may include only one backlight source 12, one backlight source corresponding to a hole image displayed in the display device.

Here the converter 10 can be a Direct Current/Direct Current (DC/DC) converter 10 or an Alternating Current/Direct Current (AC/DC) converter 10; the second switch K2 is a selection switch operable in a multi-access multiplexing mode; each LED strip in the backlight source 12 includes one Light Emitting Diode (LED) or multiple LEDs connected in series; and the driver 15 is a Pulse Width Modulation (PWM) driver.

By way of examples in which the converter 10 is a DC/DC converter, and the driver 15 is a PWM driver, as illustrated in FIG. 1, the components in the drive circuit operable in a time-division multiplexing mode are connected as follows.

Here the converter 10 is connected with the anodes of the LED strips in the backlight source 12 through the second switch K2, the cathodes of the LED strips in the backlight source 12 are connected with the drain of the first Metal Oxide Semiconductor Field Effect Transistor (MOSFET) 13, the gate of the first MOSFET 13 is connected with one terminal of the PWM driver 15, the source of the first MOSFET 13 is connected with the sampling circuit Rs 14, the sampling circuit Rs 14 is grounded, and the other terminal of the PWM drive 15 is connected with the backlight processing unit 16, where the backlight processing unit can be a processor or a processing circuit.

In some embodiment, the first MOSFET 13 is a switch element configured to be turned on when any one of the plurality of LED strips is powered on. Of course, the first MOSFET 13 can alternatively be another switch element, e.g., a Bipolar Junction Transistor (BJT), etc., although the embodiments of this disclosure will not be limited thereto.

In some embodiments, the backlight processing unit 16 controls the converter 10 to output power voltage required for lightening the first LED strip in the backlight source 12, and after it is determined that the converter 10 outputs the power voltage, the backlight processing unit 16 controls the second switch K2 to electrically conduct the converter 10 with the first LED strip so that power current flows into the first LED strip; and also controls the driver 15 to output a high level or a PWM signal to control the first MOSFET to be turned on to constitute a path so that the first LED strip is lightened.

In some embodiment, the first LED strip L1 and the second LED strip L2 are turned on in a time-division mode, that is, the first LED strip L1 and the second LED strip L2 are not turned on at the same time.

As can be apparent from FIG. 1, the plurality of LED strips in the backlight source 12 (i.e., the first LED strip L1, the second LED strip L2, etc.) share the same one PWM driver 15, so the voltage output by the converter 10 is provided to the respective LED strips in the backlight source 12 in a time-division mode in a lightening period, and also the PWM driver 15 outputs a driver signal according to the lightening state required by each LED strip in the backlight source 12.

Here the lightening period is determined according to a signal system, and typically an integer multiple of 50 Hz or 60 Hz; and for example, the Phase Alternative Line (PAL) is 50 Hz, so the applicable lightening period is an integer multiple of 50 Hz, and the National Television Standards Committee (NTSC) is 60 Hz, so the applicable lightening period is an integer multiple of 60 Hz.

In some embodiments, after voltage is input to the converter 10, one or more power voltage VLED applicable to the backlight source 12 is output by the converter 10, and after the second switch K2 and the first LED strip in the backlight source 12 is electrically conducted, the PWM driver 15 outputs a PWM signal for controlling the first MOSFET 13 to be turned on, where when the PWM driver 15 outputs a high level, the first LED strip in the backlight source 12 is lightened, and when the PWM driver 15 outputs a low level, the first LED strip in the backlight source 12 is quenched.

At this time, after the second switch K2 and the first LED strip in the backlight source 12 is electrically conducted, when the PWM signal output by the PWM driver 15 is at a high level, the anode and the cathode of the LED strip switched on by the second switch K2 are in an electrically conducting state so that the first LED strip is lightened. The second switch K2 is controlled to be switched so that the plurality of LED strips in the backlight source 12 sharing the same one PWM driver 15 are dimming-controlled in a time-division mode, and the second switch K2 operates so quickly that human eyes perceive no flicking due to the effect of a visual afterimage in the human eyes.

As illustrated in FIG. 1, when the second switch K2 is switched to the position ☐ in a period, the PWM driver 15 outputs a PWM signal corresponding to the LED strip L1 in the backlight source 12, and at this time, the first MOSFET 13 is turned on, and the LED strip L1 is lightened for a preset period of time; after a short dead time elapses, when the second switch K2 is switched to the position ☐ in the same period, the PWM driver 15 outputs a PWM signal corresponding to the LED strip L2 in the backlight source 12, and at this time, the first MOSFET 13 is turned on, and the LED strip L2 is lightened for a preset period of time; while the LED strip L2 is lightened, the switch is disconnected from the position ☐, and at this time, no power voltage is input to the LED strip L1 but electric charges stored while the LED strip L1 was lightened remain in the LED strip L1 and a wire thereof, so when the PWM driver 15 outputs the PWM signal required for lightening the LED strip L2, the first MOSFET 13 is turned on, and the electric charges remaining in the LED strip L1 and the wire flow so that the LED strip L1 is slightly lightened at the instance of time when it should have been turned off. Where during the dead time, the second switch K2 is disconnected from both the position ☐ and the position ②, and the first MOSFET 13 is turned off.

In some embodiments of the disclosure, a discharging circuit 21 is added to power wires of the anodes of the plurality of LED strips in the backlight source 12, and the discharging circuit can discharge the remaining electric charges in the LED strips and the power wires connected with the anodes of the LED strips in at least some period of time.

Some embodiments of the disclosure provides a backlight drive circuit, a backlight driving method, and a display device so as to address the problem in the related art that when a plurality of LED strips are driven in a time-division multiplexing mode, electric charges remain in the circuit and a backlight source after the backlight source is powered off, so that the backlight source which would otherwise have not been lightened may be lightened slightly.

In order to make the objects, technical solutions, and advantages of this disclosure more apparent, this disclosure will be described below in further details with reference to the drawings, and apparently the embodiments to be described are only a part but not all of the embodiments of this disclosure. Based upon the embodiments here of this disclosure, all the other embodiments which can occur to those ordinarily skilled in the art without any inventive effort shall fall into the claimed scope of the disclosure.

Figure 2:
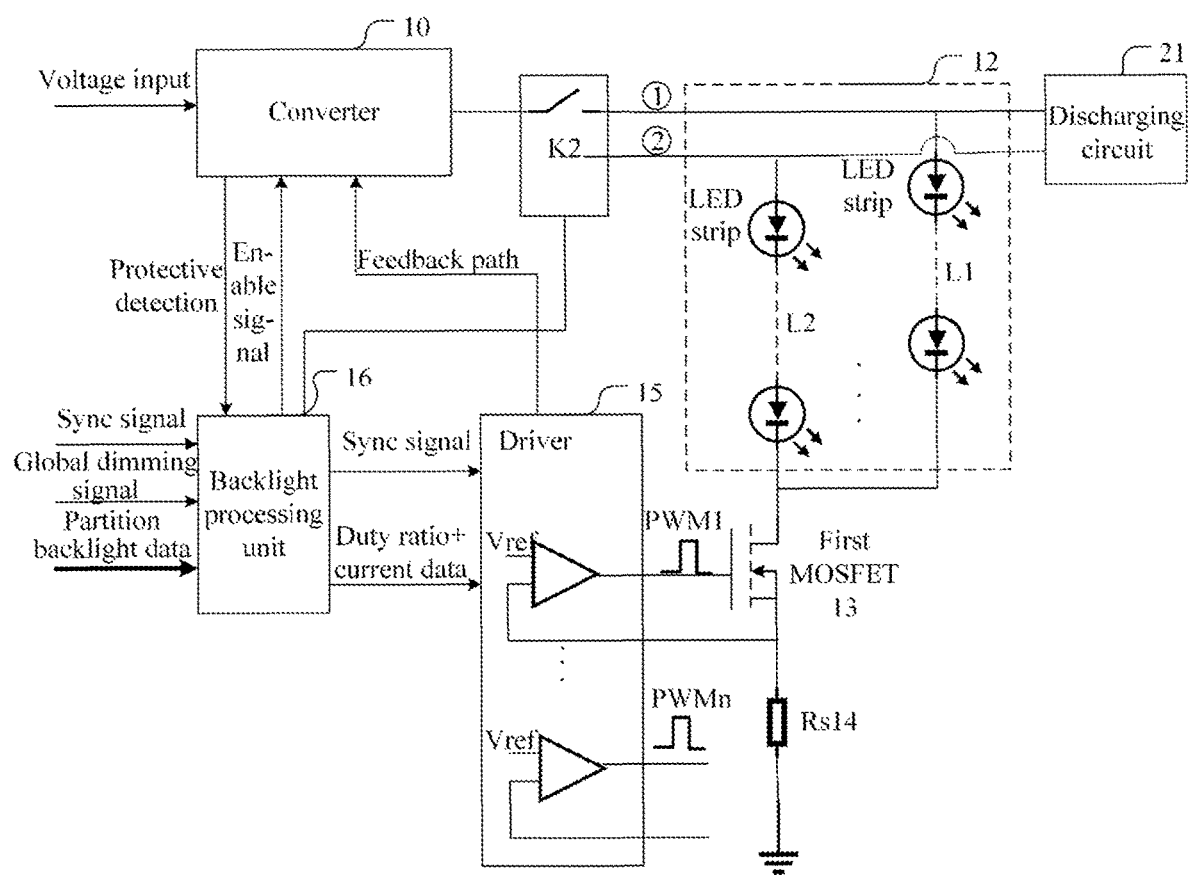
FIG. 2 is a schematic structural diagram of a backlight drive circuit according to some embodiments of the disclosure.

As illustrated in FIG. 2 which is a schematic structural diagram of a backlight drive circuit according to some embodiments of the disclosure, the backlight drive circuit includes a backlight source 12, and a discharging circuit 21 connected with the backlight source 12 in addition to the converter 10, the second switch K2, the first MOSFET 13, the sampling circuit Rs 14, the driver 15, the backlight processing unit 16, etc., where the discharging circuit 21 is configured to release remaining electric charges in the backlight source 12 and wires connected with the backlight source 12.

Here the converter 10 is connected with anodes of LED strips in the backlight source 12 through the second switch K2, and in some embodiment, the second switch K2 is a selection switch operable in a multi-access multiplexing mode, and the anodes of the plurality of LED strips in the backlight source 12 are connected with the converter 10 through the second switch K2. In another embodiment, the second switch K2 is a normal switch, and the number of second switches K2 is the same as the number of LED strips in the backlight source 12, where the anode of each of the plurality of LED strips in the backlight source 12 is connected with the converter 10 through one of the second switches K2.

In the backlight drive circuit as illustrated in FIG. 2, the plurality of LED strips in the backlight source 12 are grounded through the same one first MOSFET 13, that is, all the cathodes of the plurality of LED strips are connected with the drain of the first MOSFET 13, the source of the first MOSFET 13 is connected with one terminal of the sampling circuit Rs 14, and the other terminal of the sampling circuit Rs 14 is grounded.

Of course, in some embodiment, the cathodes of at least two LED strips can be connected with the same one MOSFET, and if at least two LED strips are defined as a unit, then there may be a plurality of such units in the backlight source 12. The cathodes of the LED strips in each unit are connected with the same one MOSFET, different units connected with different MOSSETs, and for example, the backlight source 12 includes four LED strips, i.e., the first LED strip L1, the second LED strip L2, the third LED strip L3, and the fourth LED strip L4, where the first LED strip L1 and the second LED strip L2 share the same one MOSFET, and the third LED strip L3 and the fourth LED strip L4 share the same one MOSFET; and in another example, the backlight source 12 includes five LED strips, i.e., the first LED strip L1, the second LED strip L2, the third LED strip L3, the fourth LED strip L4, and the fifth LED strip L5, where the first LED strip L1 and the second LED strip L2 share the same one MOSFET, and the third LED strip L3, the fourth LED strip L4, and the fifth LED strip L5 share the same one MOSFET.

In some embodiments of the disclosure, the discharging circuit 21 is connected with the anodes of the plurality of LED strips, and in some embodiments, the discharging circuit 21 is configured to release remaining electric charges in the plurality of LED strips and wires connected with the plurality of LED strips. In some embodiments of the disclosure, the discharging circuit 21 can be connected concurrently with the plurality of LED strips, and release the electric charges in the plurality of LED strips and the wires connected with the plurality of LED strips during the dead time, and taking the first LED strip L1 and the second LED strip L2 as an example, after the anode of the first LED strip L1 in the backlight source 12 is disconnected from the second switch K2, the remaining electric charges in the first LED strip L1 and the wire connected with the first LED strip L1 can be released by the discharging circuit 21 during the dead time, so while the second LED strip L2 is turned on, when the first MOSFET outputs a high level so that the cathode of the first LED strip L1 will also be turned on, the first LED strip L1 will not be lightened because there are no remaining electric charges in the first LED strip L1 and the wire connected with the first LED strip L1.

Here the discharging circuit 21 can be embodied in a number of forms, and a part of the embodiments will be described below in details by way of examples.

In some embodiments, the discharging circuit 21 includes a discharging unit 22 and a short circuit protection circuit 23.

In some embodiments, the discharging circuit 21 includes a discharging unit 22 and a plurality of short circuit protection units 23, where the short circuit protection units 23 correspond to the LED strips in the backlight source 12 in a one-to-one manner; the discharging unit 22 has an input connected with outputs of the plurality of short circuit protection units 23, and an output grounded; and the anode of each LED strip is connected with an input of one corresponding short circuit protection unit 23.

Figure 3:
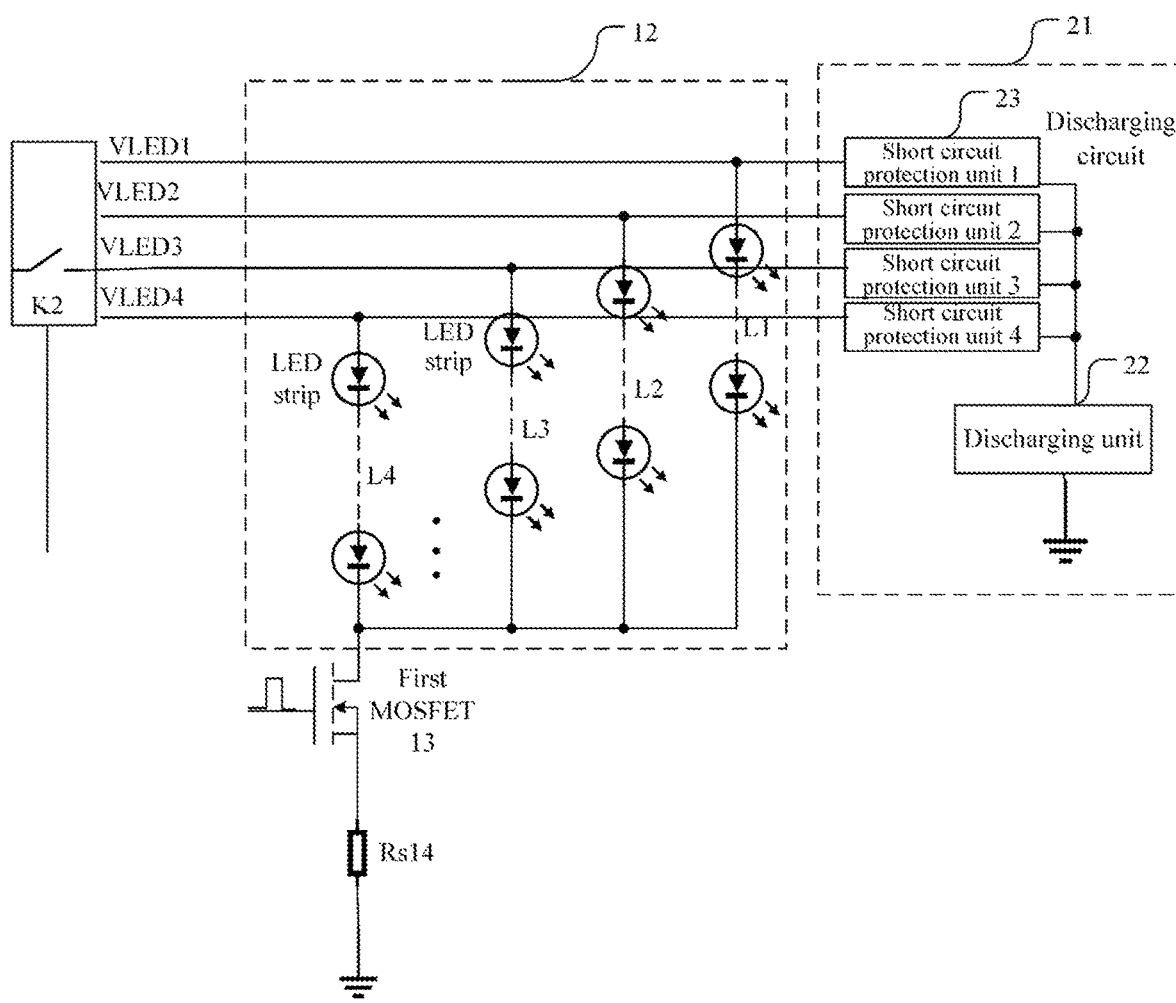
FIG. 3 is a schematic structural diagram of a discharging circuit in the first backlight drive circuit according to some embodiments of the disclosure.

As illustrated in FIG. 3 which is a schematic structural diagram of the discharging circuit 21 in the first backlight drive circuit according to some embodiments of the disclosure, the backlight source 12 includes four LED strips (the first LED strip L1, the second LED strip L2, the third LED strip L3, and the fourth LED strip L4), and there are four short circuit protection units 23 (the first short circuit protection unit, the second short circuit protection unit, the third short circuit protection unit, and the fourth short circuit protection unit), for example.

Here the first short circuit protection unit (represented as a short circuit protection unit 1 as illustrated) is connected with the anode of the first LED strip L1 in the backlight source 12; the second short circuit protection unit (represented as a short circuit protection unit 2 as illustrated) is connected with the anode of the second LED strip L2 in the backlight source 12; the third short circuit protection unit (represented as a short circuit protection unit 3 as illustrated) is connected with the anode of the third LED strip L3 in the backlight source 12; the fourth short circuit protection unit (represented as a short circuit protection unit 4 as illustrated) is connected with the anode of the fourth LED strip L4 in the backlight source 12; and the output of each short circuit protection unit is connected with the discharging unit 22.

Figure 4:
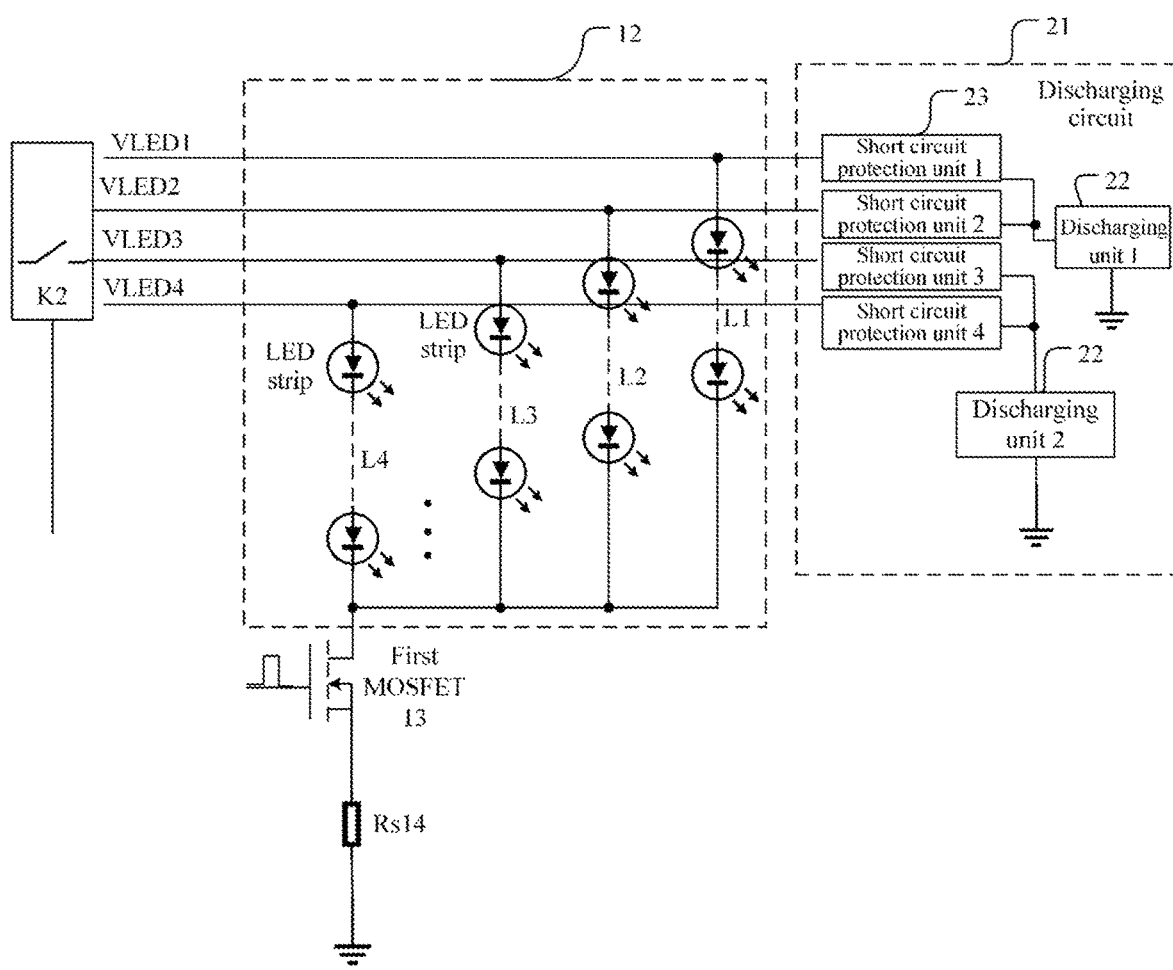
FIG. 4 is a schematic structural diagram of a discharging circuit in the second backlight drive circuit according to some embodiments of the disclosure.

It shall be noted that in some embodiments of this disclosure, the plurality of short circuit protection units 23 may share the same one discharging unit 22, or may be connected with different discharging units 22, and as illustrated in FIG. 4 which is a schematic structural diagram of the discharging circuit 21 in the second backlight drive circuit according to some embodiments of the disclosure, as can be apparent from FIG. 4, the first short circuit protection unit (represented as a short circuit protection unit 1 as illustrated) and the second short circuit protection unit (represented as a short circuit protection unit 2 as illustrated) share the same one discharging unit 22 (represented as a discharging unit 1 as illustrated), and the third short circuit protection unit 23 and the fourth short circuit protection unit 23 share the same one discharging unit 22 (represented as a discharging unit 2 as illustrated). How they are arranged in the backlight drive circuit can be determined according to an initial wiring pattern in the backlight drive circuit. Of course, each short circuit protection unit 23 can alternatively be connected respectively with one of the discharging units 22.

Here the short circuit protection unit(s) 23 is configured to normally release electric charges in the backlight source 12 and the wires connected with the backlight source 12 to thereby prevent short-circuiting from occurring in the circuit.

In some embodiments of the disclosure, the discharging circuit 21 can be connected directly with the anodes of the plurality of LED strips so that the anodes of the plurality of LED strips are grounded through the discharging circuit 21, that is, the discharging circuit 21 is enabled all the time so that the plurality of LED strips are being discharged all the time, and in this way, after an LED strip lastly electrically conducted with the second switch K2 is powered off, the LED strip lastly electrically conducted with the second switch K2 will not be lightened at an instance of time when said LED strip should not have been lightened, because the voltage in said LED strip and the wire connected with said LED strip is released by the discharging circuit 21 during the dead time.

In some other embodiments, a switch can be arranged between the discharging circuit 21 and the anodes of the plurality of LED strips, and after the first LED strip lastly electrically conducted with the second switch K2 is powered off, and before the second LED strip is powered on, the switch arranged between the discharging circuit 21 and the anodes of the plurality of LED strips is closed so that the discharging circuit 21 is enabled, and the electric charges in the first LED strip lastly electrically conducted with the second switch K2, and the electric charges in the wire connected with the first LED strip is released by the discharging circuit 21, and as such, the first LED strip lastly electrically conducted with the second switch K2 will not be lightened at an instance of time when the LED strip should not have been lightened. In this way, leakage current occurring because the discharging circuit is connected with the anodes of the backlight source 12 all the time while the first LED strip or the second LED strip is normally lightened can be prevented.

In some embodiments, each LED strip is connected with one of the short circuit protection units 23, each short circuit protection unit 23 is connected with the discharging unit 22, and when the second switch K2 does not turn on any one of the LED strips in the backlight source 12, that is, the converter 10 does not output any power voltage (such as, during the dead time), the electric charges in the first LED strip lastly electrically conducted with the second switch K2, and the electric charges in the wire connected with the first LED strip is discharged by the short circuit protection unit 23 and the discharging unit 22; and since the remaining electric charges are released, when the second switch turns on the second LED strip in the backlight source 12, the first MOSFET 13 is turned on, so the first LED strip lastly electrically conducted with the second switch K2 will not be lightened at an instance of time when the first LED strip should not have been lightened.

Here the discharging unit 22 can be connected in a number of patterns, and a part of the embodiments will be described below in details by way of examples.

In some embodiment, the discharging unit 22 includes: a resistor R30, an MOSFET 31, and a first controller 32.

In some embodiments, the MOSFET 31 has a gate connected with the first controller 32, a drain connected with one terminal of the resistor R30, and a source grounded; and the other terminal of the resistor R30 is connected with the output(s) of the short circuit protection unit(s) 23.

Figure 5:
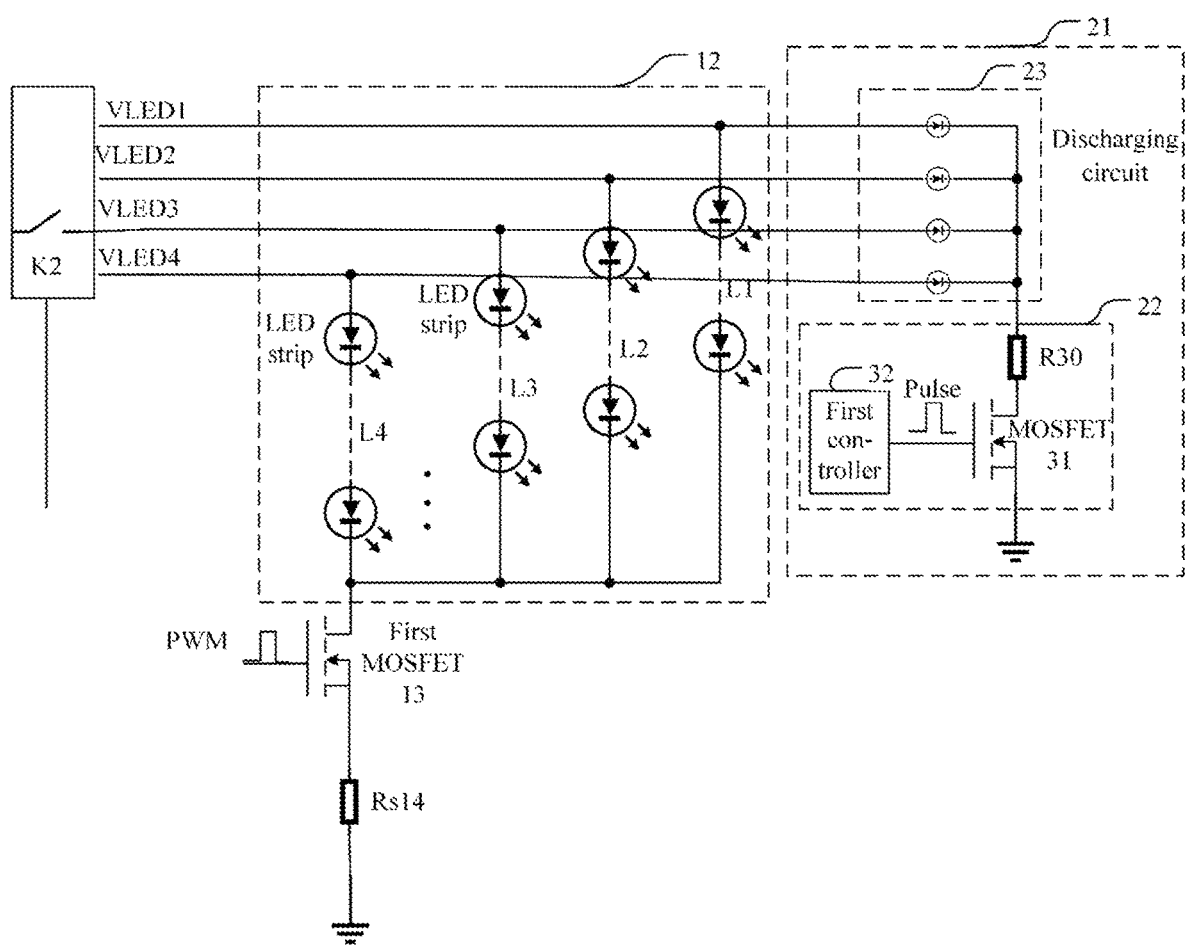
FIG. 5 is a discharging schematic diagram of the discharging circuit in the first backlight drive circuit according to some embodiments of the disclosure.

As illustrated in FIG. 5 which is a discharging circuit scheme diagram of the discharging circuit 21 in the first backlight drive circuit according to some embodiments of the disclosure, where the short circuit protection units 23 are diodes, for example.

In some embodiments the short circuit protection unit(s) may be a short circuit protection circuit.

In some embodiments, the anode of each LED strip in the backlight source 12 is connected with a diode, the output of the diode is connected with one terminal of the resistor R30, the other terminal of the resistor R30 is connected with the drain of the MOSFET 31, the source of the MOSFET 31 is grounded, and the gate of the MOSFET 31 is connected with the first controller 32.

Here the first controller 32 is configured to control the MOSFET 31 to be turned on or tuned off, where after an LED strip electrically conducted with the second switch K2 is disconnected from the second switch K2, the first controller 32 controls the MOSFET 31 to be turned on.

Here the first controller 32 includes but will not be limited to a part or all of the following controllers: a Field Programmable Gate Array (FPGA), a Central Processing Unit (CPU), and a Micro Controller Unit (MCU).

In some embodiments, after the first LED strip electrically conducted with the second switch K2 is disconnected from the second switch K2, that is, no power is input to the first LED strip through the second switch K2, the first controller 32 outputs Discharge Enable at a high level so that the MOSFET 31 is turned on, and the discharging circuit 21 starts operating to release the electric charges in the first LED strip lastly electrically conducted with the second switch K2, and the electric charges in the wire connected with the first LED strip.

In some embodiments of the disclosure, when two adjacent LED strips in the backlight source 12 are lightened in sequence through power voltage, there is a dead time between two adjacent power supply instances of time. The MOSFET 31 operates to output Discharge Enable during the dead time between the two adjacent power supply instances of time, and at this time, the first controller 32 controls the MOSFET 31 to be turned on so that the discharging circuit 21 operates.

By way of an example in which there are four LED strips (the first LED strip L1, the second LED strip L2, the third LED strip L3, and the fourth LED strip L4) in the backlight source 12, and the four LED strips share the same one backlight driver, the four LED strips in the backlight source 12 need four power voltage VLED1 to VLED4, and when the converter 10 outputs a power voltage, and the first MOSFET 13 is turned on, one of the LED strips is lightened; and when the converter 10 does not output any power voltage to the light strips, or the first MOSFET 13 is turned off, the LED strip is quenched.

Figure 6:
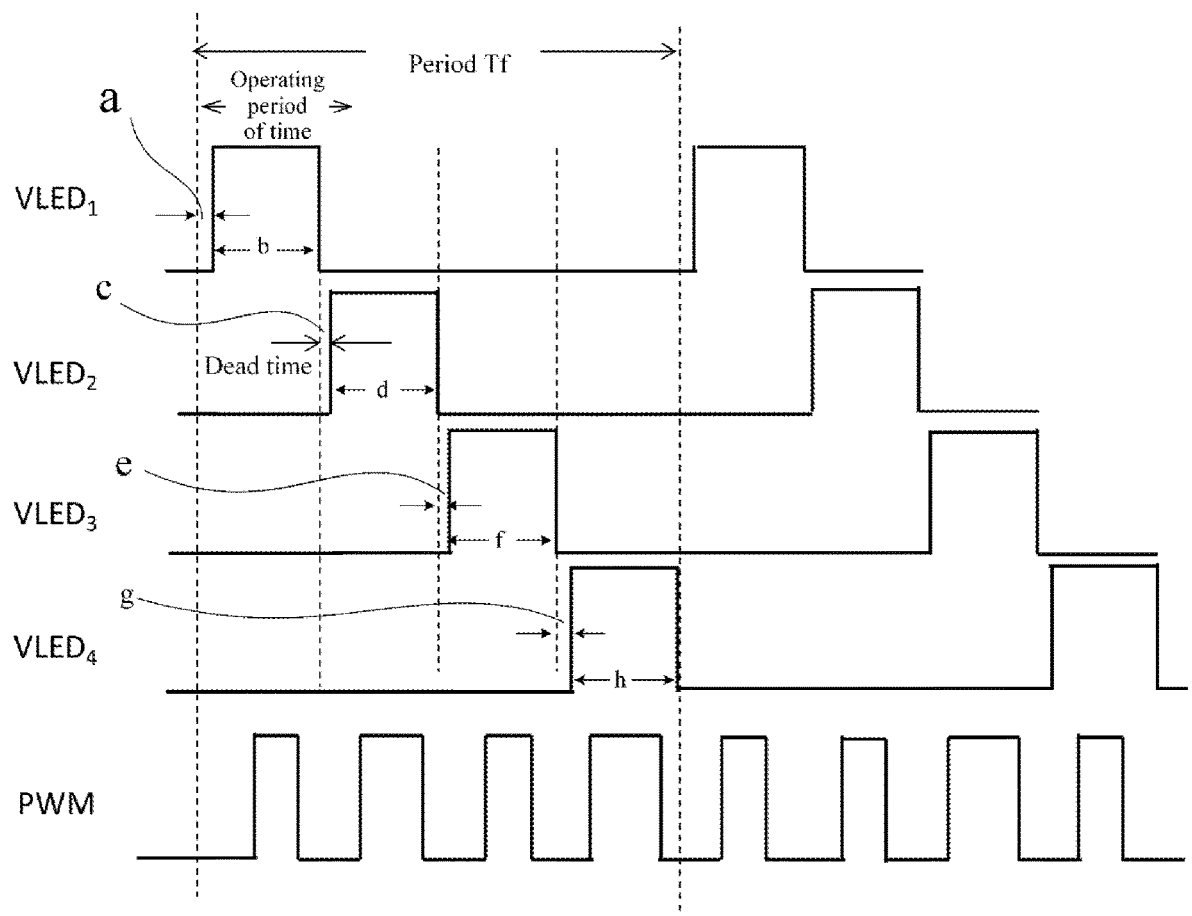
FIG. 6 is a power supply timing diagram in the multiplexing mode according to some embodiments of the disclosure.

As illustrated in FIG. 6 which is a power supply timing diagram in the four-access multiplexing mode according to some embodiments of the disclosure, the four LED strips (the first LED strip L1, the second LED strip L2, the third LED strip L3, and the fourth LED strip L4) are lightened sequentially in a time-division mode in a period, and each LED strip in the backlight source 12 is being lightened for the same period of time, so a period of time corresponding to one period is equally divided into four periods of time, and each of the periods of time includes the period of time for which an LED strip is being lightened, and a dead time between two adjacent power supply instances of time.

When a refresh frequency of power voltage is 60 Hz (the period is 16.67 ms), for example, the period 16.67 ms corresponding to 60 Hz is equally divided into four periods of time, each of the four periods of time is 4.17 ms, so each LED strip is being lightened for 4 ms, and the dead time is 0.17 ms.

As can be apparent from FIG. 6, in the first period of time, when the dead time is represented as "a", VLED1 is low, neither the first LED strip L1 nor the fourth LED strip L4 is lightened, and at this time, the discharging circuit 21 starts operating, but it releases the remaining electric charges in the fourth LED strip L4 and the wire connected with the fourth LED strip L4 generated in the last period; in the period of time b, VLED1 is high, and the first LED strip L1 is lightened; in the second period of time, during the dead time c, VLED1 is low, VLED2 is low, and at this time, the discharging circuit 21 releases the remaining electric charges in the first LED strip L1 and the wire connected with the first LED strip L1; in the period of time d, VLED2 is high, and at this time, the second LED strip L2 is lightened; in the third period of time, during the dead period of time e, VLED2 is low, VLED3 is low, and at this time, the discharging circuit 21 releases the remaining electric charges in the second LED strip L2 and the wire connected with the second LED strip L2; in the period of time f, VLED3 is high, and the third LED strip L3 is lightened; in the fourth period of time, during the dead time g, VLED3 is low, VLED4 is low, and at this time, the discharging circuit 21 releases the remaining electric charges in the third LED strip L3 and the wire connected with the third LED strip L3; and in the period of time g, VLED4 is high, and at this time, the fourth LED strip L4 is lightened. This relates to an operating flow of the backlight drive circuit in the technical solution according to the embodiment of this disclosure in one period.

In some embodiments, the second switch K2 is controlled to enable a power circuit in the respective periods of time above. The second switch K2 receives a control signal output by the backlight processing unit in each of the periods of time above, and controls an LED strip, needing to be lightened in each period of time, to be electrically conducted with the converter 10; and after each period of time elapses, the second switch K2 receives a control signal output by the backlight processing unit, controls the currently lightened LED strip to be disconnected from the converter 10, and also enables the discharging circuit 21 of the LED strip disconnected from the converter 10 to discharge the LED strip disconnected from the converter 10, and discharge the wire connected with said LED strip.

Figure 10:
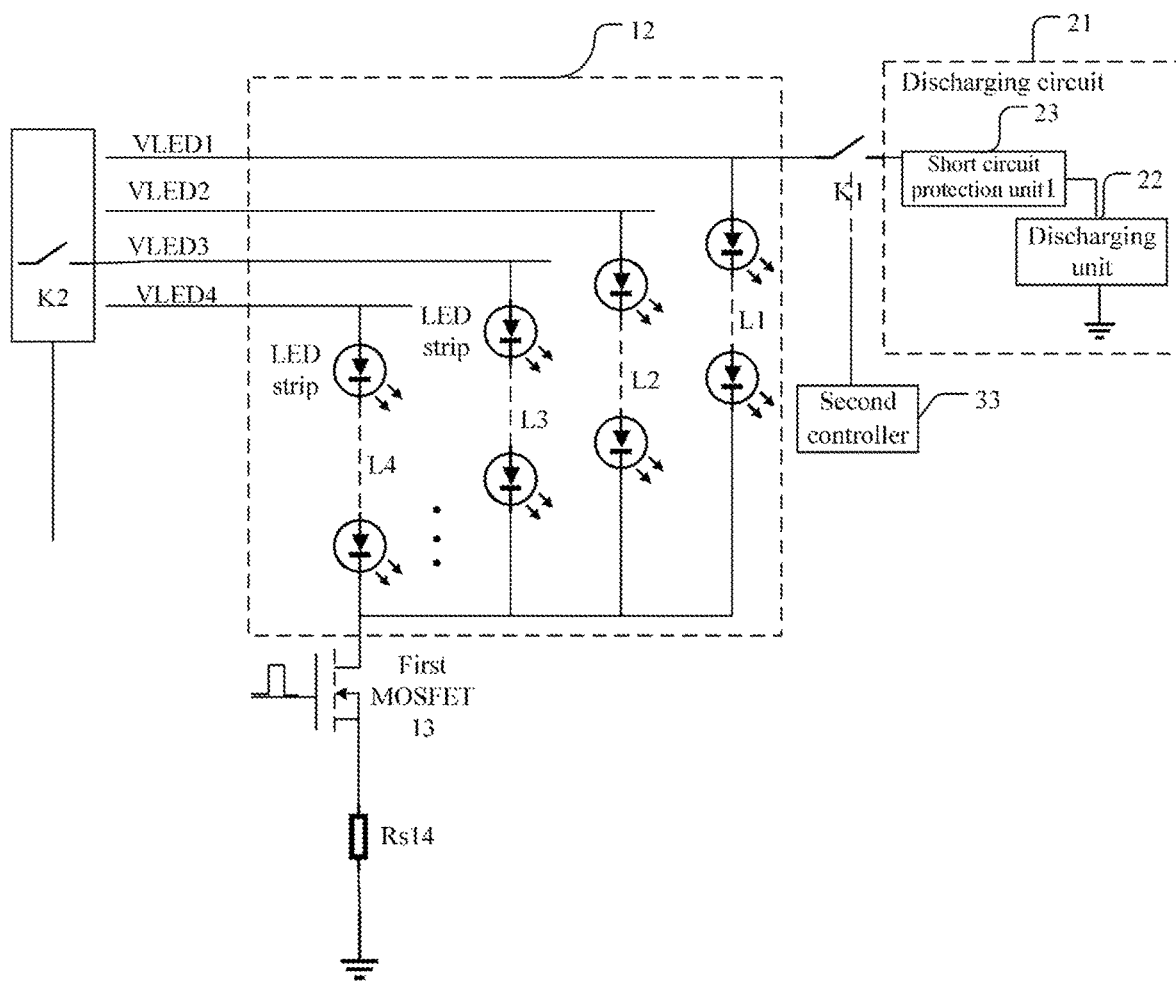
FIG. 10 is a schematic structural diagram of a discharging circuit in the third backlight drive circuit according to some embodiments of the disclosure.
Figure 12:
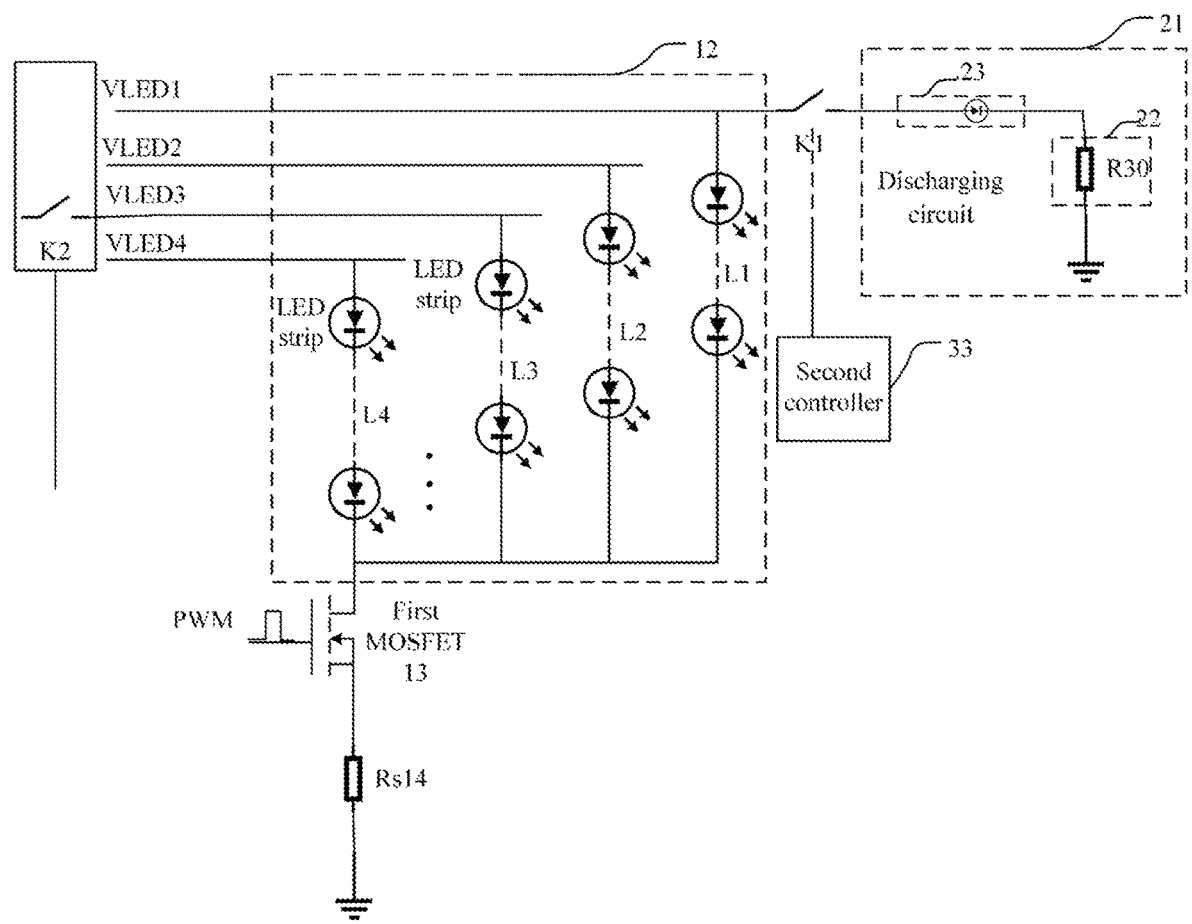
FIG. 12 is a discharging schematic diagram of a discharging circuit in the fifth backlight drive circuit according to some embodiments of the disclosure.
Figure 13:
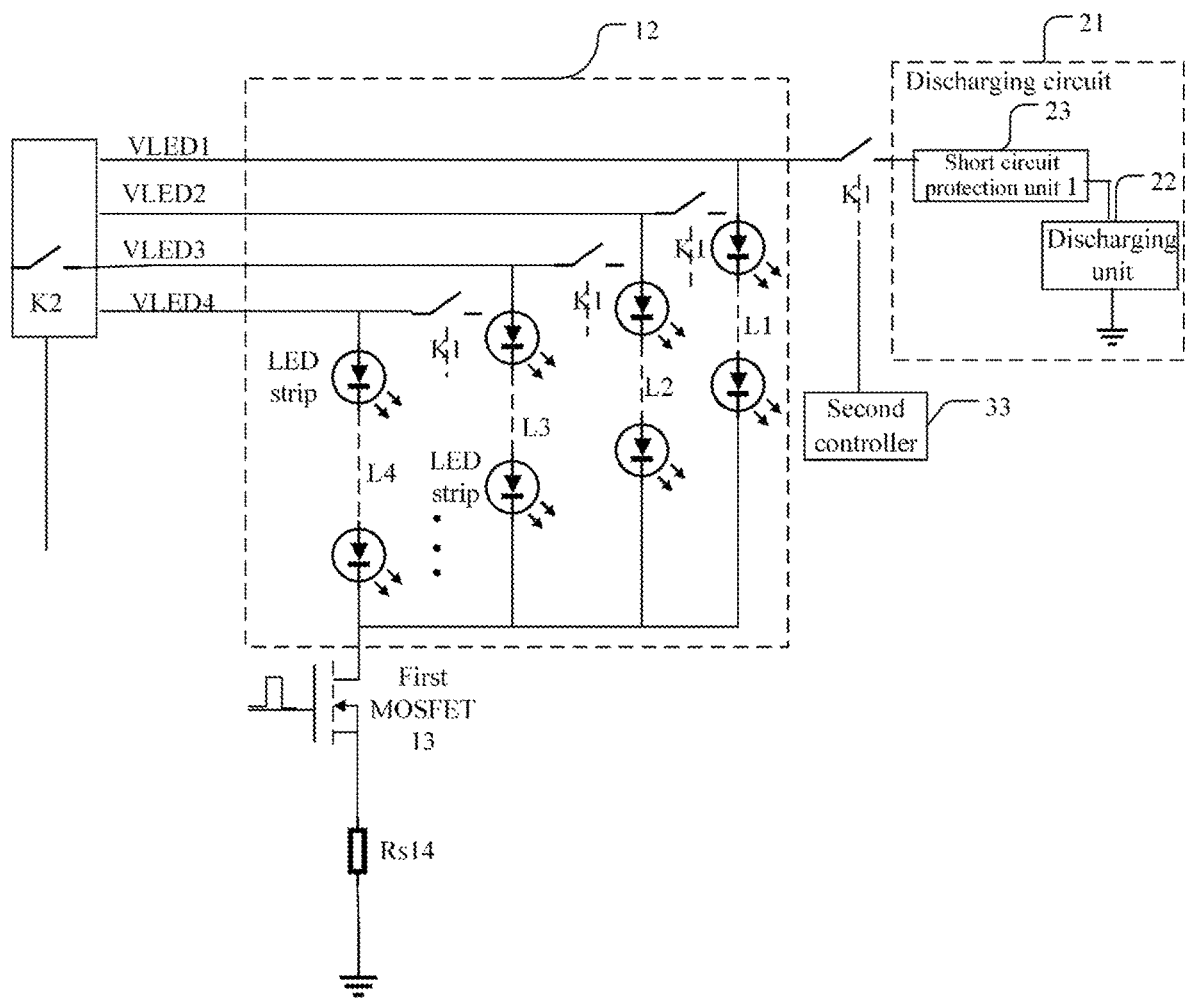
FIG. 13 is a schematic structural diagram of a discharging circuit in the sixth backlight drive circuit according to some embodiments of the disclosure.

In some embodiments, when a first switch K1 is arranged between the anodes of the plurality of LED strips, and the discharging circuit, and there is no switch in the discharging circuit 21 (as illustrated in FIG. 10, FIG. 12, and FIG. 13, for example), the discharging circuit 21 of an LED strip to be discharged is enabled through the first switch K1. In some implementations, after a lightening period of time of an LED strip ends, and before the next LED strip is lightened, the first switch K1 receives a control signal output by the second controller 33 connected with the first switch K1, and controls the first switch K1 connected with the input of the discharging circuit 21 to be electrically conducted with the LED strip to be discharged. In some embodiment, the first switch K1 and the second controller 33 may be arranged in the discharging circuit, and connected in the same pattern.

Figure 11:
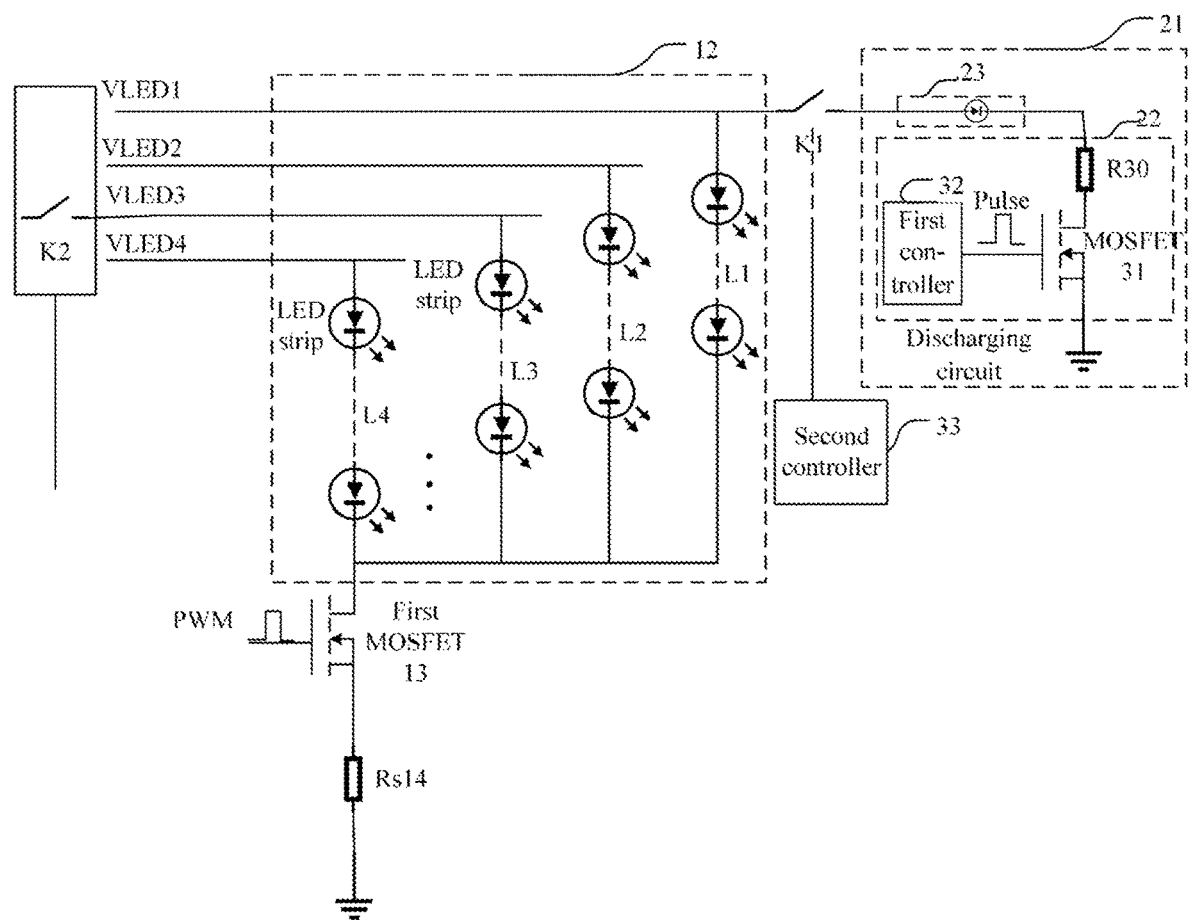
FIG. 11 is a discharging circuit scheme diagram of a discharging circuit in the fourth backlight drive circuit according to some embodiments of the disclosure.
Figure 18:
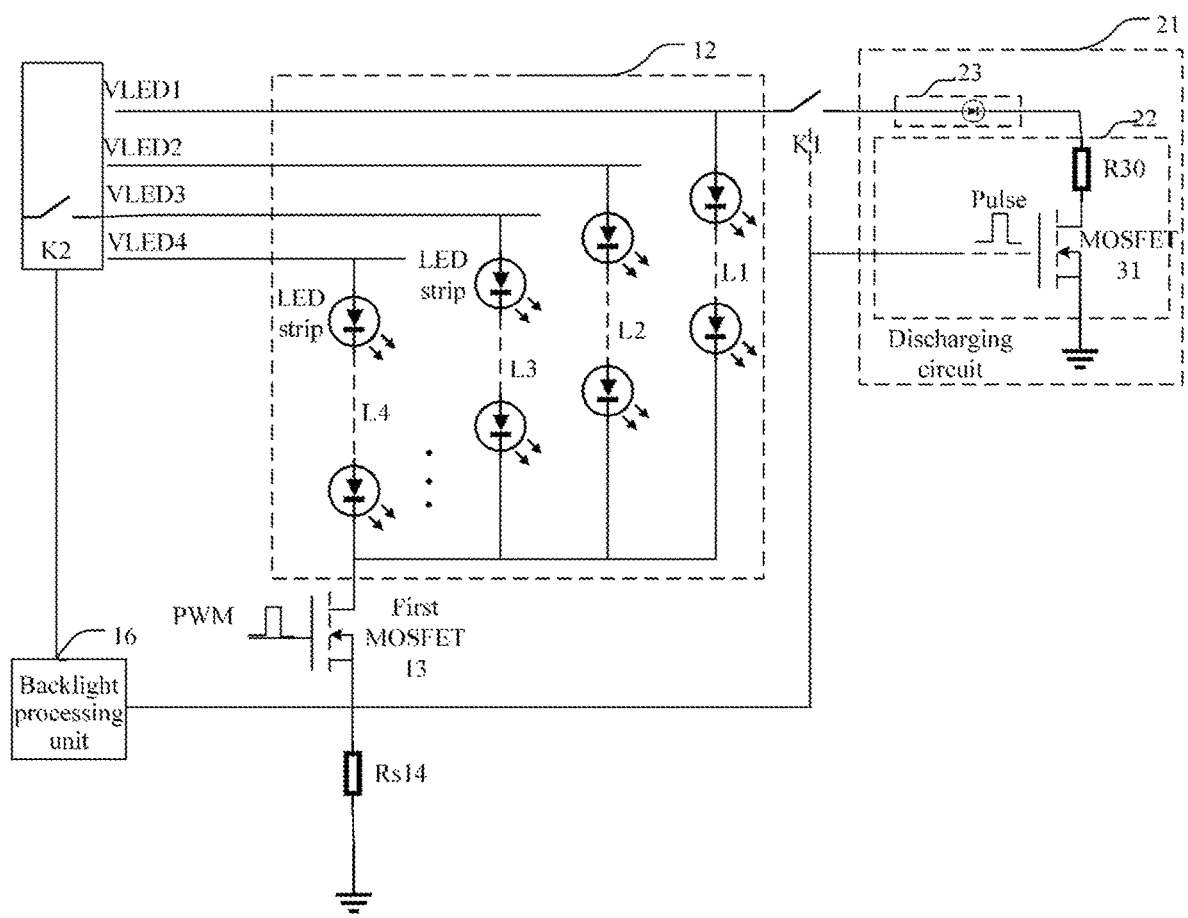
FIG. 18 is a schematic structural diagram of a discharging circuit in another backlight drive circuit according to some embodiments of the disclosure.

In some embodiments, when a first switch K1 is arranged between the anodes of the plurality of LED strips, and the discharging circuit, and there is a switch in the discharging circuit 21 to control the discharging circuit 21 to electrically conduct (for example, the discharging unit 22 includes an MOSFET 31 as illustrated in FIG. 11 and FIG. 18, where the MOSFET 31 can be turned on only if a control signal is received by the gate of the MOSFET 31), after a lightening period of time of an LED strip ends and before the next LED strip is lightened, the first switch K1 receives the control signal output by the second controller 33 connected with the first switch K1, and controls the first switch K1 connected with the input of the discharging circuit 21 to be electrically conducted with the LED strip to be discharged, and also the gate of the MOSFET 31 in the discharging unit 22 of the discharging circuit receives the control signal so that the MOSFET 31 is turned on, thus constituting a path in the discharging circuit 21, and furthermore the discharging circuit of the LED strip to be discharged is enabled to discharge the LED strip to be discharged, and the wire connected with the LED strip. In some embodiment, the first switch K1 and the second controller 33 may be arranged in the discharging circuit, and connected in the same pattern.

In some embodiments, when no first switch K1 is arranged between the anodes of the plurality of LED strips, and the discharging circuit (that is, the anodes of the plurality of LED strips are connected directly with the input of the discharging circuit), and there is a switch in the discharging circuit 21 (for example, the discharging unit 22 includes an MOSFET 31 as illustrated in FIG. 11 and FIG. 18, where the MOSFET 31 can be turned on only if a control signal is received by the gate of the MOSFET 31), after a lightening period of time of an LED strip ends and before the next LED strip is lightened, also the gate of the MOSFET 31 in the discharging unit 22 of the discharging circuit receives the control signal so that the MOSFET 31 is turned on, thus constituting a path in the discharging circuit 21, and furthermore the discharging circuit of the LED strip to be discharged is enabled to discharge the LED strip to be discharged, and the wire connected with the LED strip.

Figure 7:
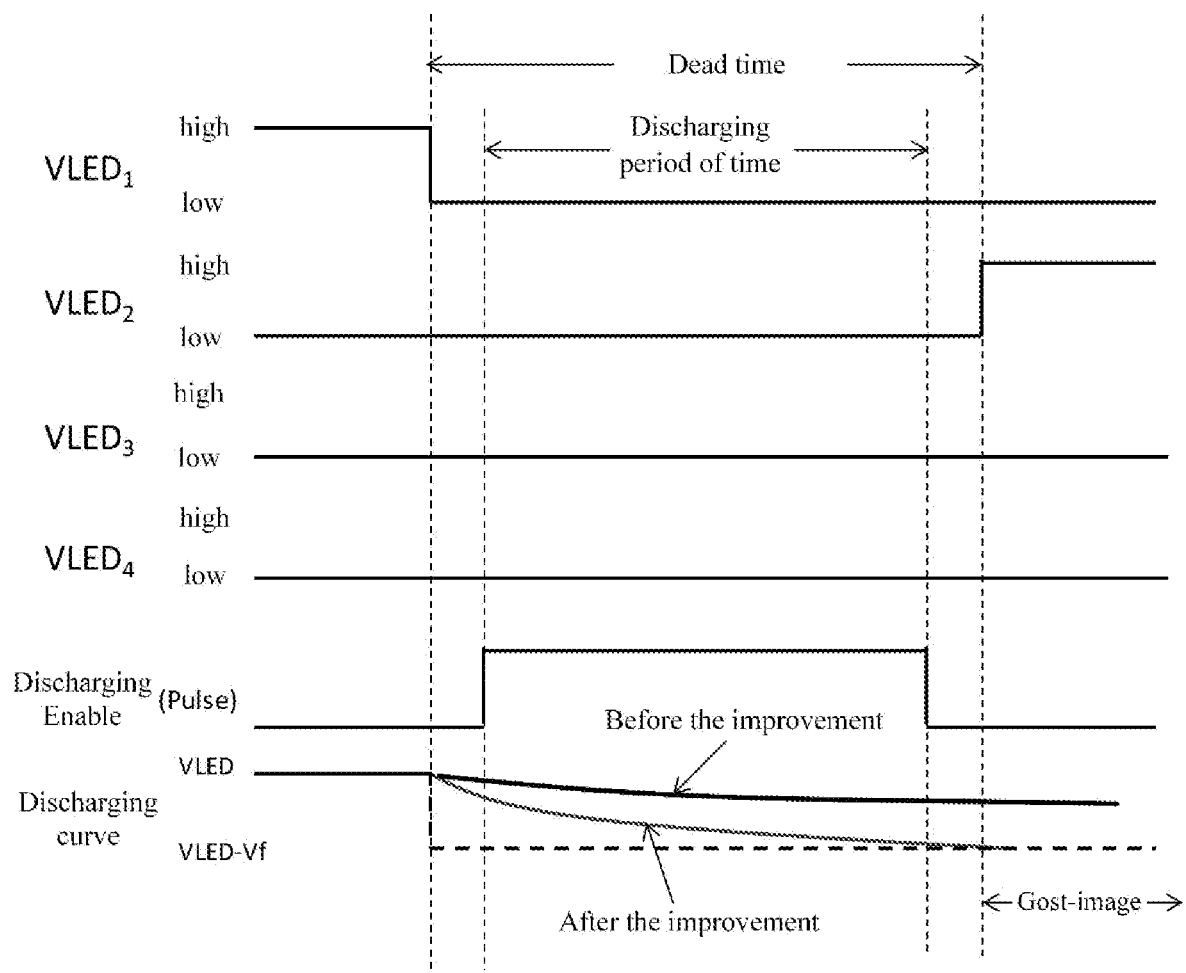
FIG. 7 is a timing diagram of discharging control according to some embodiments of the disclosure.

In some implementations, the discharging circuit 21 in operation can release the remaining electric charges in an LED strip in the backlight source 12, and remaining electric charges in the wire connected with the LED strip as illustrated in the schematic diagram of FIG. 7 which is a timing diagram of discharging control according to some embodiments of the disclosure.

As can be apparent from FIG. 7, after a high level of VLED1 ends, when VLED1 is at a low level, and VLED2, VLED3, and VLED4 are at a low level, that is, the power voltage VLED1 and VLED2 are during a dead time, Discharge Enable is high, so the discharging circuit 21 starts operating, and the LED strip will not be lightened as long as VLED is controlled to be discharged to voltage below VLED-Vf, where VLED-Vf is critical voltage at which LEDs in the LED strip are turned on. The "ghost-image" as illustrated in FIG. 7 represents such a phenomenon that an LED strip which would otherwise have not been lightened is slightly lightened. Where the curve labeled with "after improvement" shows a discharging curve when adopting the discharging circuit provided by the embodiments of the disclosure, it can be seen that the electric charges in the first LED strip is discharged and the voltage thereof is lowered to VLED-Vf, and the first LED strip will not be lightened even if the switch transistor connected with the anode of the first LED strip is turned on. The curve labeled with "before improvement" shows a discharging curve when adopting the discharging circuit in the related art, it can be seen that the voltage in the first LED strip is above VLED-Vf after the electric charges in the first LED strip is discharged, and the "ghost-image" is appeared, i.e., the first LED strip is lightened when the first LED strip should not have been lightened.

In some embodiments, a period of time for which the LED strip which was lastly lightened, but is currently not lightened is being discharged during the dead time is a discharging period of time, where the discharging period of time is shorter than or equal to the dead time.

In some embodiments, the dead time is a preset period of time.

In some embodiments of the disclosure, since the improved backlight drive circuit includes the discharging circuit 21, the amount of electric charges discharged in some period of time is more than that before it is improved; or if the same amount of electric charges are discharged, then the backlight drive circuit including the discharging circuit 21 will have a higher discharging speed than that in the backlight drive circuit which is not improved, so that the electric charges in an LED strip, and the wire connected with the LED strip can be released in the shortest period of time to thereby minimize an influence upon powering with VLED, but also a user will not perceive any phenomenon that the LED strip would otherwise have been slightly lightened.

In some embodiments, the discharging unit 22 includes a resistor R30.

In some implementations, the resistor R30 has one terminal connected with the output(s) of the short circuit protection unit(s) 23, and the other terminal grounded.

In the circuit above, when the discharging unit only includes a resistor, it is discharging in operation all the time without being controlled by any controller, and after an LED strip is disconnected from the second switch K2, the discharging circuit is still enabled, and further release the electric charges in the backlight source and the wires connected with the backlight source, so that the backlight source will not be lightened at an instance of time when the backlight source should not have been lightened.

In some embodiments, the resistance of the resistor R30 is higher than an inner resistance of an LED strip. The resistance of the resistor R30 is higher than an inner resistance of an LED strip so that less power will be consumed even if the resistor R30 is connected directly with the anode of an LED strip.

Figure 8:
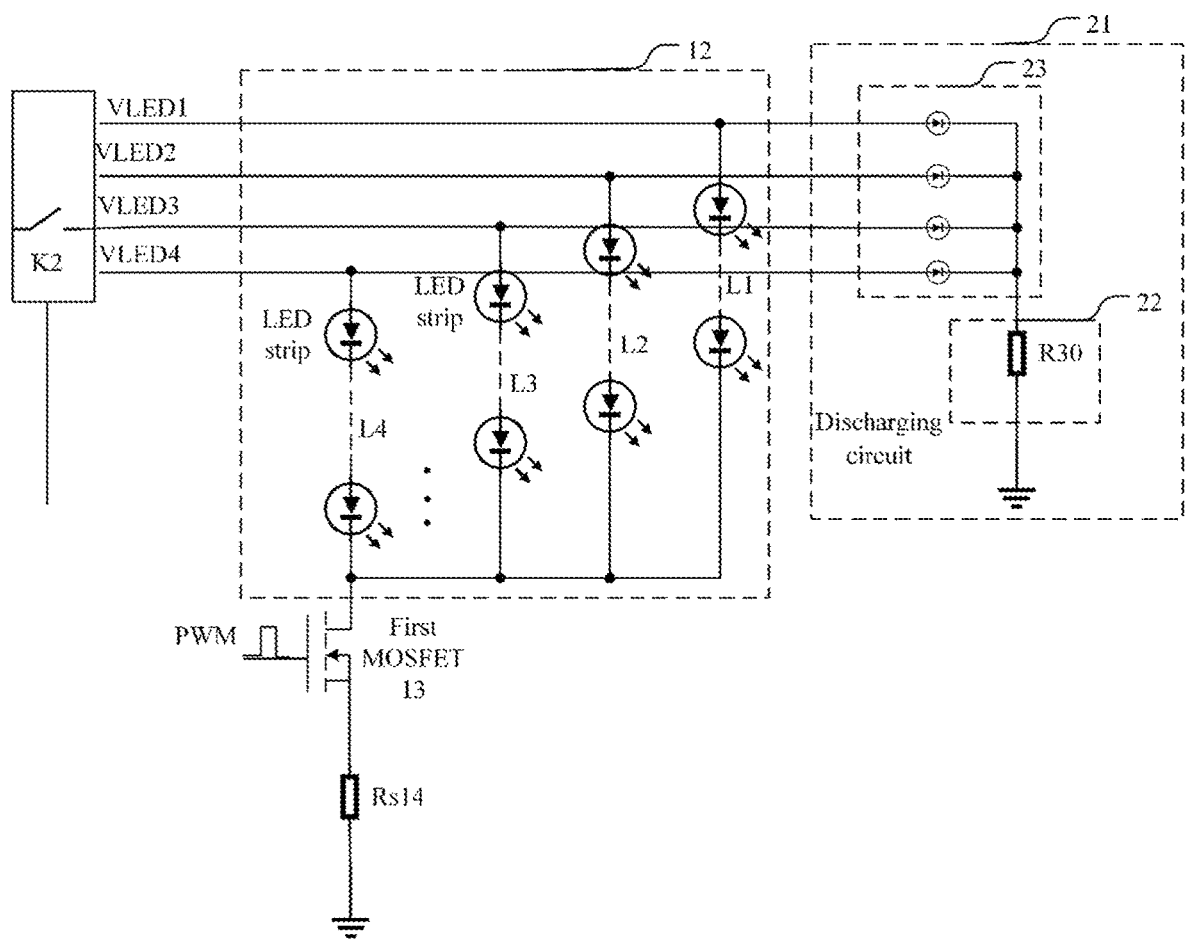
FIG. 8 is a discharging schematic diagram of the discharging circuit in the second backlight drive circuit according to some embodiments of the disclosure.

As illustrated in FIG. 8 which is a discharging circuit scheme diagram of the discharging circuit 21 in the second backlight drive circuit according to some embodiments of the disclosure, a short circuit protection unit 23 is a diode, for example.

In some embodiments, the anode of each LED strip in the backlight source 12 is connected with a diode, and the output of the diode is connected with a resistor R30 which is grounded. After the anode of the LED strip is disconnected from the second switch K2, the short circuit protection unit 23 and the discharging unit 22 in the discharging circuit 21 are still enabled, so the voltage in the LED strip, and the wire connected with the LED strip is released by the discharging circuit 21.

In some embodiments, the discharging unit 22 can include a plurality of resistors R30, and the plurality of resistors R30 can be connected in series, in parallel, or both.

Figure 9A:
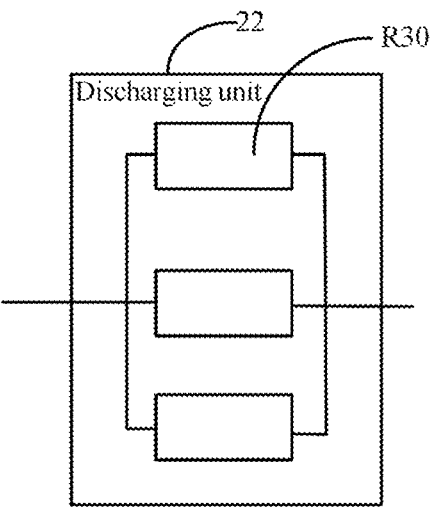
FIG. 9A is the first connection pattern of resistors in a discharging unit according to some embodiments of the disclosure.
Figure 9B:
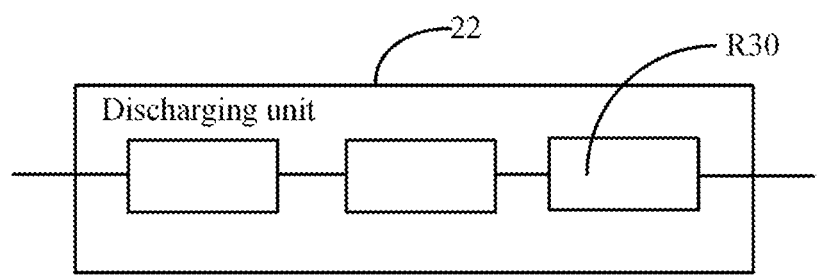
FIG. 9B is the second connection pattern of resistors in a discharging unit according to some embodiments of the disclosure.
Figure 9C:
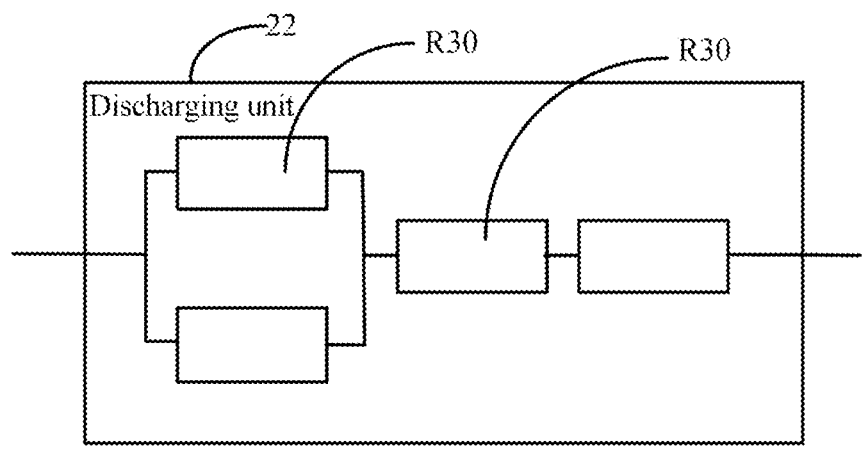
FIG. 9C is the third connection pattern of resistors in a discharging unit according to some embodiments of the disclosure.

As illustrated in FIG. 9A to FIG. 9C, the discharging unit 22 in the embodiment of this disclosure includes at least a number of resistors 30 connected in series and/or in parallel, that is, at least the resistors 30 may be connected only in series, only in parallel, or both, although the embodiment of this disclosure will not be limited thereto. Particularly as illustrated in FIG. 9A, the discharging unit 22 includes three resistors R30 connected in parallel. As illustrated in FIG. 9B, the discharging unit 22 includes three resistors R30 connected in series. As illustrated in FIG. 9C, the discharging unit 22 includes four resistors R30, where two resistors R30 connected in parallel are connected in series with the other two resistors R30. It shall be noted that the number of resistors R30 in the discharging unit 22, and how the respective resistors R30 are connected with each other are generally set manually as needed in reality while the backlight drive circuit is being set.

In some embodiments, after the first LED strip is disconnected from the second switch K2, and the electric charges in the first LED strip, and the wire connected with the first LED strip are discharged by the short circuit protection circuit 23 and the discharging unit 22, and since the electric charges in the first LED strip are discharged, when the second switch K2 is electrically conducted with the second LED strip, and the first MOSFET 13 is turned on, the first LED strip will not be lightened.

In other embodiments, the discharging circuit includes one discharging unit 22 and one short circuit protection unit 23.

In some embodiments, the discharging circuit 21 includes a discharging unit 22, a short circuit protection unit 23, a first switch K1, and a second controller 33; the short circuit protection unit 23 has an input connected with the anodes of the plurality of LED strips through the first switch K1, and an output connected with an input of the discharging unit 22; and an output of the discharging unit 22 is grounded.

In the circuit above, the second controller 33 controls the state of the first switch K1 so that after the first LED strip to be discharged is electrically conducted with the short circuit protection unit 23, the electric charges in the first LED strip, and the wire connected with the first LED strip are released, and furthermore when the second switch K2 is closed to switch on a power supply circuit of another LED strip, and the first MOSFET is turned on, the first LED strip will not be slightly lightened.

As illustrated in FIG. 10 which is a schematic structural diagram of the discharging circuit 21 in the third backlight drive circuit according to some embodiments of the disclosure, there are four LED strips (the first LED strip L1, the second LED strip L2, the third LED strip L3, and the fourth LED strip L4) in the backlight source 12, for example.

As can be apparent from FIG. 10, the backlight source 12 includes a discharging unit 22 and a short circuit protection unit 23, that is, the four LED strips (the first LED strip L1, the second LED strip L2, the third LED strip L3, and the fourth LED strip L4) share the same discharging unit 22 and short circuit protection unit 23, where a first switch K1 is arranged between the four LED strips (the first LED strip L1, the second LED strip L2, the third LED strip L3, and the fourth LED strip L4) and the short circuit protection unit 23, and a second controller 33 is arranged to control the first switch K1 to be closed or opened. As illustrated, the dotted line below the first switch K1 indicates that the first switch K1 is controlled by the second controller 33.

In some embodiments, when it is determined that some LED strip is to be discharged during a dead time, the second controller 33 controls the first switch K1 to be electrically conducted with the LED strip needing to be discharged, so that the LED strip needing to be discharged is electrically conducted with the discharging unit 22 and the short circuit protection unit 23, and subsequently discharged.

For example, when it is determined that the second LED strip L2 is to be discharged, at this time, the second controller 33 controls the first switch K1 to be electrically conducted with the second LED strip L2 so that the discharging circuit 21 is enabled to discharge the second LED strip L2.

In some embodiments, the second controller 33 controls the state of the first switch K1 so that the LED strip to be discharged is electrically conducted with the short circuit protection unit 23, and then the electric charges in the LED strip to be discharged, and the wire connected with the LED strip are released, and furthermore when the second switch K2 is closed, and the first MOSFET 13 is turned on, the LED switch which would otherwise have not been lightened will not be slightly lightened.

Here the discharging unit 22 can be connected in a number of patterns as described below in details.

In some embodiments, the discharging unit includes: a resistor R30, an MOSFET 31, and a first controller 32.

In some embodiments, the MOSFET 31 has a gate connected with the first controller 32, a drain connected with one terminal of the resistor R30, and a source grounded; and the other terminal of the resistor R30 is connected with the output of the short circuit protection unit.

As illustrated in FIG. 11 which a discharging circuit scheme diagram of the discharging circuit 21 in the fourth backlight drive circuit according to some embodiments of the disclosure, the short circuit protection unit 23 is a diode, for example.

In some embodiments, the first switch K1 is connected with the diode in the short circuit protection unit 23, the output of the diode is connected with the resistor R30 in the discharging unit 22, the other terminal of the resistor R30 is connected with the drain of the MOSFET 31, the source of the MOSFET 31 is grounded, and the gate of the MOSFET 31 is connected with the first controller 32.

Here the first controller 32 is configured to control the MOSFET 31 to be turned on or turned off, and when it is determined that an LED strip electrically conducted with the second switch K2 is powered off, the first controller 32 controls the MOSFET 31 to be turned on.

In some embodiments, after the first LED strip electrically conducted with the second switch K2 is powered off, the second controller 33 controls the first switch K1 to be closed to electrically conduct the first LED strip with the diode, and also the first controller 32 controls the MOSFET 31 to be turned on so that the first LED strip, the diode, and the resistor R30 constitute a path, and release the electric charges in the first LED strip, and the wire connected with the first LED strip. In FIG. 11, the dotted line below the first switch K1 indicates that the first switch K1 is controlled by the second controller 33.

For example, the LED strip electrically conducted with the second switch K2 is the second LED strip L2, and after the second switch K2 is disconnected from the second LED strip L2, the second controller 33 controls the first switch K1 to electrically conducted the second LED strip L2 with the diode, and also the first controller 32 controls the MOSFET 31 to be turned on, so that the electric charges in the second LED strip L2, and the wire connected with the second LED strip L2 are discharged.

In some embodiment, the discharging unit 22 includes a resistor R30.

In some embodiments, the resistor R30 has one terminal connected with the output of the short circuit protection unit 23, and the other terminal grounded.

As illustrated in FIG. 12 which is a discharging circuit scheme diagram of the discharging circuit 21 in the fifth backlight drive circuit according to some embodiments of the disclosure, the short circuit protection unit 23 is a diode, for example.

In some embodiments, the first switch K1 has one terminal connected with the LED strips in the backlight source 12, and the other terminal connected with the diode, the diode is further connected with the resistor R30, and the other terminal of the resistor R30 is grounded. After the anode of an LED strip of the backlight source is disconnected from the second switch K2, the second controller 33 controls the first switch K1 to be closed so that the LED strip to be discharged is electrically conducted with the diode, and the discharging unit 22 and the short circuit protection unit 23 in the discharging circuit 21, and the LED strip constitute a path, and release the electric charges in the LED strip to be discharged, and the wire connected with the LED strip. In FIG. 12, the dotted line below the first switch K1 indicates that the first switch K1 is controlled by the second controller 33.

It shall be noted that the first switch K1 can be a switch operable in a multi-access multiplexing mode in the implementation above. Of course, the first switch K1 can alternatively be a normal switch, or the first switch K1 can be an MOSFET.

When the first switch K1 is a normal switch, each LED strip is connected with one first switch K1, and the number of second controllers 33 may be the same as the number of first switches K1, or a second controller 33 may control a plurality of first switches K1. As illustrated in FIG. 13 which is a schematic structural diagram of the discharging circuit 21 in the sixth backlight drive circuit according to some embodiments of the disclosure, a second controller 33 controls a plurality of first switches K1, for example, and the dotted lines below the first switches K1 indicate that the first switches K1 are controlled by the second controller 33.

In some embodiments, when some LED strip is to be discharged, the second controller K2 controls the first switch K1 corresponding to said LED strip to be closed. For example, it is determined that the second LED strip L2 is to be discharged and the second controller 33 controls the first switch K1 corresponding to the second LED strip L2 to be closed so that the second LED strip L2 is discharged.

In another embodiment, the discharging circuit 21 includes a plurality of discharging units 22.

In some embodiments, the discharging circuit 21 includes a plurality of discharging units 22 corresponding to the plurality of LED strips in a one-to-one manner, where each discharging unit 22 has an input connected with the anode of corresponding one of the LED strips, and an output grounded.

Figure 14:
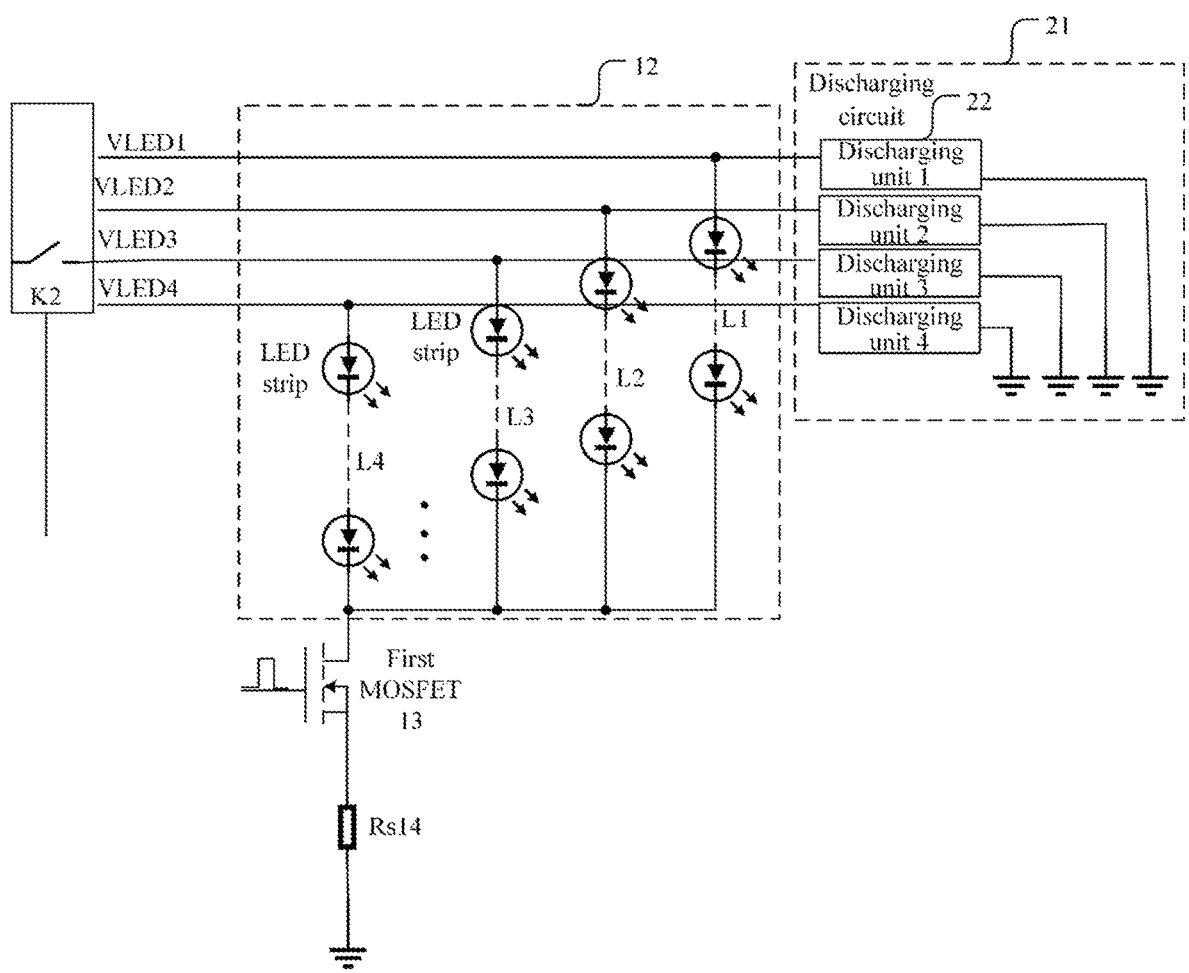
FIG. 14 is a schematic structural diagram of a discharging circuit in the seventh backlight drive circuit according to some embodiments of the disclosure.

As illustrated in FIG. 14 which is a schematic structural diagram of the discharging circuit 21 in the seventh backlight drive circuit according to some embodiments of the disclosure, the backlight source 12 includes four LED strips (the first LED strip L1, the second LED strip L2, the third LED strip L3, and the fourth LED strip L4), and there are four discharging units 22 (the first discharging unit, the second discharging unit, the third discharging unit, and the fourth discharging unit), for example.

Here the anode of each LED strip is connected with one of the discharging units 22, and as can be apparent from FIG. 14, the first LED strip L1 is connected with the first discharging unit (represented as a first charging unit 1); the second LED strip L2 is connected with the second discharging unit (represented as a first charging unit 2); the third LED strip L3 is connected with the third discharging unit (represented as a third charging unit 3); the fourth LED strip L4 is connected with the fourth discharging unit (represented as a fourth charging unit 4); and the output of each discharging unit is grounded.

In some embodiments, each LED strip is connected with one of the discharging units, and each discharging unit 22 is grounded; and when an LED strip is to be discharged, the voltage in said LED strip is transmitted from the anode of said LED strip to the discharging circuit 21, and finally released, and since there is no voltage in the LED strip, when the switch is electrically conducted with another LED strip, and the first MOSFET 13 is turned on, said LED strip will not be lightened at an instance of time when said LED strip should not have been lightened.

In the embodiment as illustrated in FIG. 14, the discharging units 22 will not be limited to any particular connection pattern, but the discharging units 22 can be the charging units according to any one of the embodiments above. For example, the discharging units 22 each includes a resistor with one terminal connected with the anode of corresponding one of the LED strips, and the other terminal grounded; or the discharging units 22 each includes a resistor, an MOSFET, and a first controller, where the MOSFET has a gate connected with the first controller, a drain connected with one terminal of the resistor, and a source grounded, and the other terminal of the resistor is connected with the anode of the LED strip.

Figure 15:
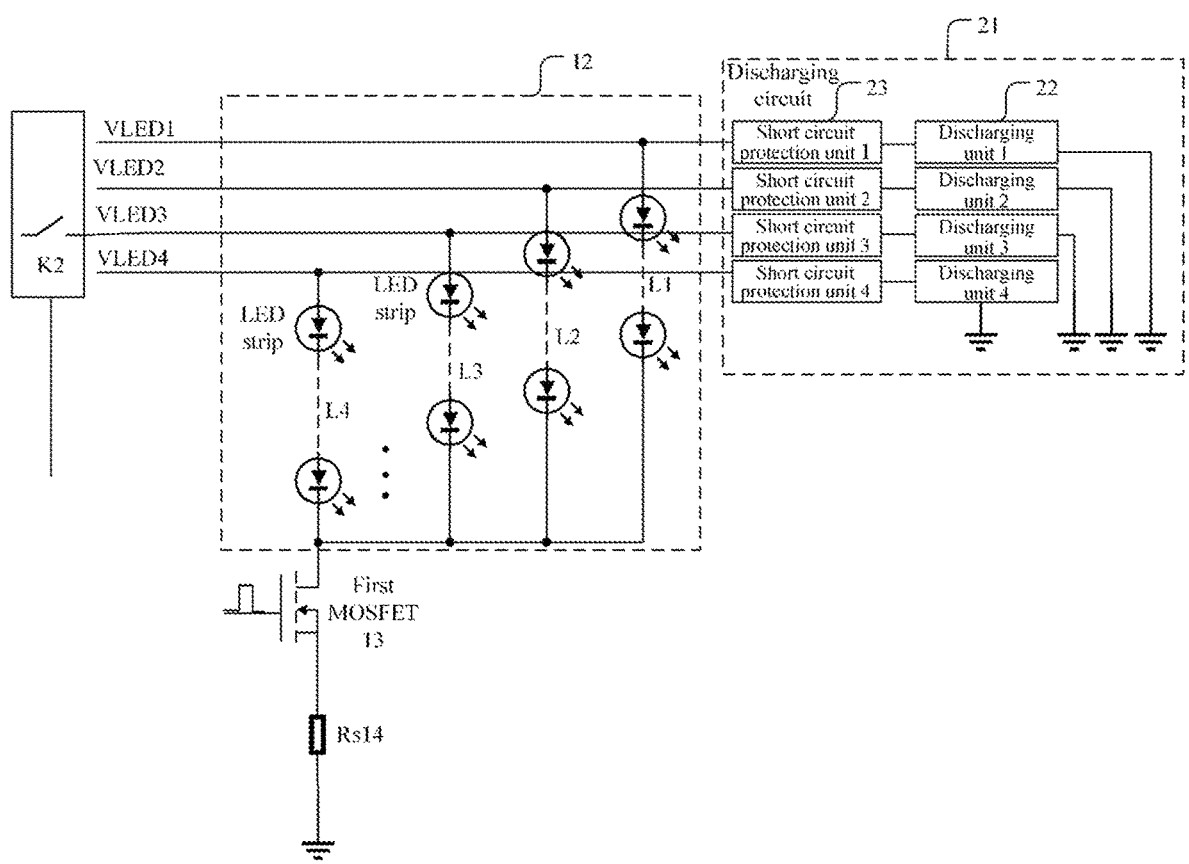
FIG. 15 is a schematic structural diagram of a discharging circuit in the eighth backlight drive circuit according to some embodiments of the disclosure.

In some embodiments of the disclosure, when each LED strip corresponds to one of the discharging units 22, a short circuit protection unit 23 is further arranged between the discharging unit 22 and the LED strip, and in some embodiments, FIG. 15 illustrates a schematic structural diagram of the discharging circuit 21 in the eighth backlight drive circuit according to some embodiments of the disclosure.

Here the discharging units 22 can be connected in a number of patterns as described below in details.

In some embodiments, the discharging units 22 each include a resistor R30, an MOSFET 31, and a first controller 32.

In some embodiments, the discharging units 22 each include a resistor R30, an MOSFET 31, and a first controller 32, where the MOSFET 31 has a gate connected with the first controller 32, a drain connected with the resistor R30, and a source grounded; and the other terminal of the resistor R30 is connected with the anode of the LED strip.

Here the first controller 32 is configured to control the MOSFET 31 to be turned on or turned off, and after the LED strip is powered off, the first controller 32 controls the MOSFET to be turned on.

Figure 16:
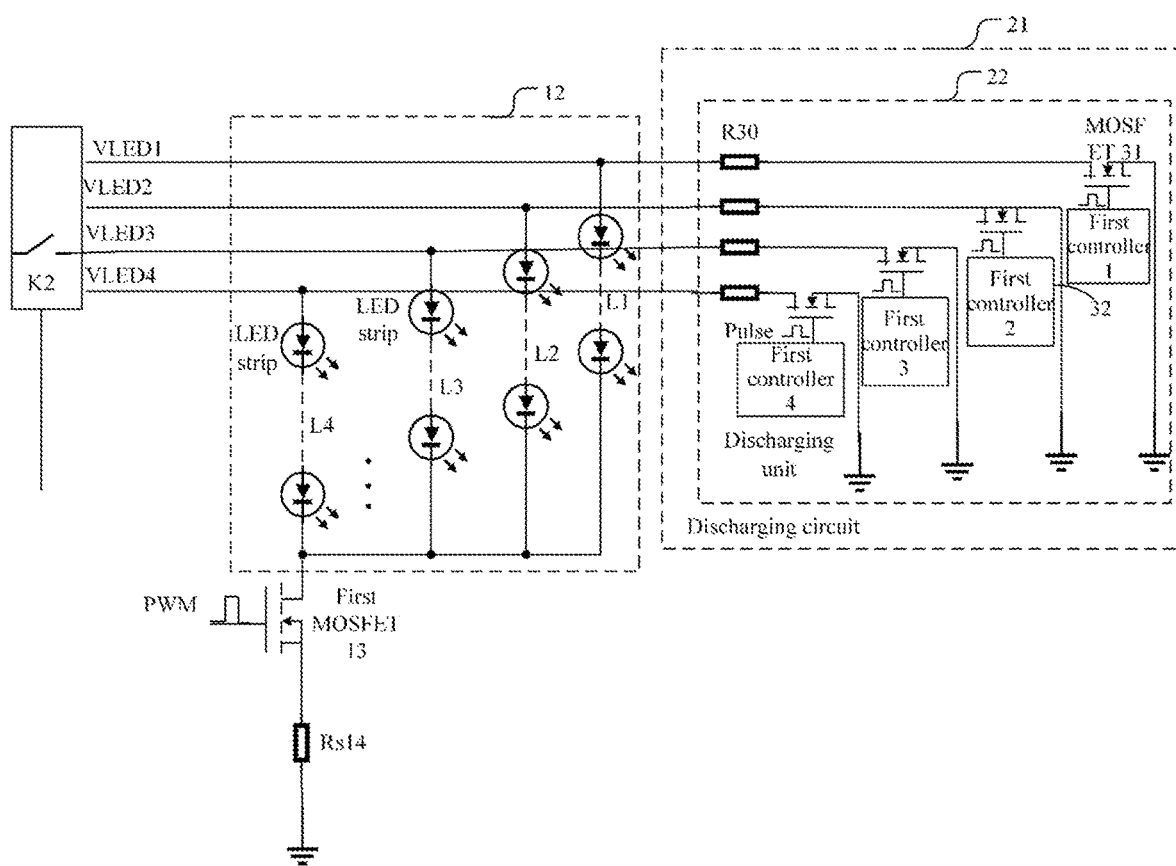
FIG. 16 is a discharging schematic diagram of a discharging circuit in the ninth backlight drive circuit according to some embodiments of the disclosure.

As illustrated in FIG. 16 which is a discharging circuit scheme diagram of the discharging circuit 21 in the ninth backlight drive circuit according to some embodiments of the disclosure, the anode of each LED strip is connected with an resistor R30, the other terminal of each resistor R30 is connected with a drain of an MOSFET 31, each MOSFET 31 has a source grounded, and a gate connected with a first controller 32, and after the LED strip corresponding to the resistor connected with the first controller 32 is powered off, the first controller 32 outputs a high level to control the MOSFET 31 to be turned on. For example, after the second LED strip L2 connected with the resistor connected with the second first controller 32 (represented as a first controller 2 in FIG. 16) is powered off, the second first controller 32 outputs a high level to control the MOSFET 31 to be turned on so that the electric charges in the second LED strip L2, and the wire connected with the second LED strip L2 are released.

In some embodiments, as illustrated in FIG. 16, after the first LED strip L1 is disconnected from the second switch K2, the first first controller 32 (represented as a first controller 1 in FIG. 16) outputs a high level to control the MOSFET 31 connected with the first first controller 32 to be turned on, and at this time, the first LED strip L1, the resistor R30, and the MOSFET 31 constitute a pathway, so that the remaining electric charges in the first LED strip L1, and the wire connected with the first LED strip L1 are charged by the discharging circuit 21 through the resistor R30 and the MOSFET 31, so the first LED strip L1 will not be lightened even if the second switch K2 is electrically conducted with the second LED strip L2, and the first MOSFET 13 is turned on.

In some embodiment, each of the discharging units 22 includes a resistor R30.

In some embodiments, each of the discharging units 22 includes a resistor R30, where: the resistor R30 has one terminal connected with the anode of corresponding one of the LED strips, and the other terminal grounded.

Figure 17:
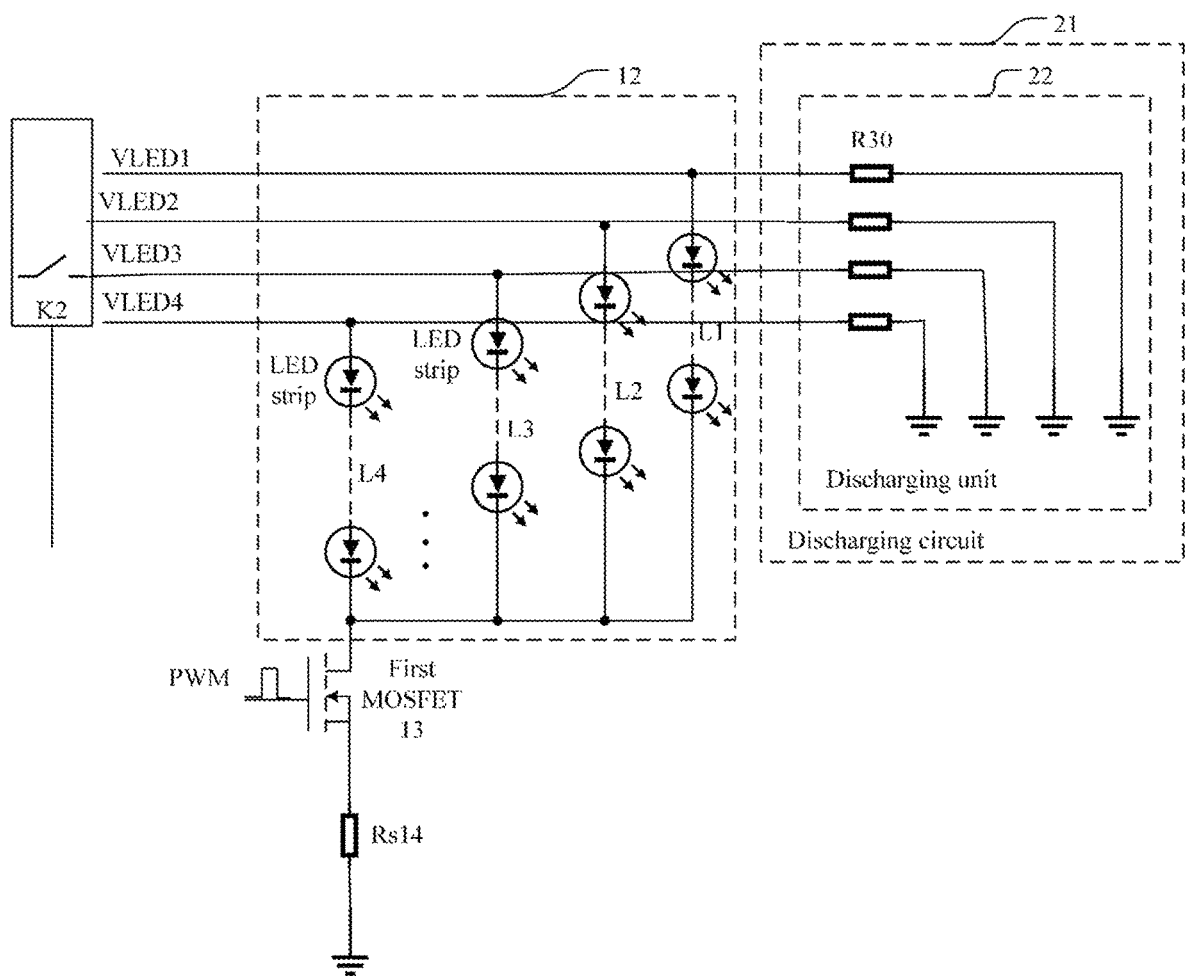
FIG. 17 is a discharging schematic diagram of a discharging circuit in the tenth backlight drive circuit according to some embodiments of the disclosure.

As illustrated in FIG. 17 which is a discharging circuit scheme diagram of the discharging circuit 21 in the tenth backlight drive circuit according to some embodiments of the disclosure, in some embodiments, the anode of each LED strip is connected with a resistor R30, and the other terminal of the resistor R30 is grounded. At this time, after the first LED strip is disconnected from the second switch K2, since the anode of the first LED strip, and the resistor 30 constitute a path, the remaining electric charges in the first LED strip, and the wire connected with the first LED strip are released through the resistor R30, so when the second switch K2 is electrically conducted with the second LED strip L2, and the first MOSFET 13 is turned on, the first LED strip will not be lightened.

It shall be noted that in the embodiment above, each of the discharging unit 22 can include a plurality of resistors R30, and the plurality of resistors R30 can be connected in series, in parallel, or both.

In some embodiments of the disclosure, only one controller may be arranged to control the switches to be closed or opened, and the MOSFETs to be turned on or turned off, and the controller can be the backlight processing unit 16 in the existing circuit. Stated otherwise, the first controller 32 and the second controller 33 may not be arranged in the design of the circuit, but the backlight processing unit can control the MOSFETs to be turned on or turned off, and the switches to be closed and opened. In some embodiments, as illustrated in FIG. 18 which is a schematic structural diagram of a discharging circuit in another backlight drive circuit according to some embodiments of the disclosure, where all of the first switch K1, the second switch K2, and the MOSFET 31 are controlled by the backlight processing unit 16. In FIG. 18, the dotted line below the first switch K1, the dotted line below the second switch K2, and the dotted line at the gate of the MOSFET 31 indicate that the first switch K1, the second switch K2 and the MOSFET 31 are controlled by the backlight processing unit 16.

In some embodiment, the driver can control the first MOSFET 13 to be turned on during the dead time so that the first MOSFET 13 can discharge the LED strip connected therewith during the dead time, and at this time, the discharging circuit can be arranged at the anode of the LED strip for an improved charging effect, or no additional charging circuit may be arranged at the anode of the LED strip, but the MOSFET 13 can be controlled only using the original hardware circuit during the dead time to discharge the LED strip.

In some embodiments, some embodiments of the disclosure further provides a display device including the backlight drive circuit according to any one of the technical solutions above.

Based upon the similar idea, some embodiments of the disclosure provides a backlight driving method, applicable to a display device including a backlight source and a power supply circuit, where the backlight driving method includes: in the first power supply period of time, controlling the power supply circuit to power the first LED strip in the backlight source; after the first power supply period of time elapses, disconnecting the first LED strip from the power supply circuit, and controlling a discharging circuit to discharge the first LED strip in a preset period of time; and after the preset period of time elapses, controlling the power supply circuit to power the second LED strip in the backlight source.

In some embodiment, a first switch element is arranged between the backlight source and the power supply circuit, cathodes of the first LED strip and the second LED strip are grounded through a second switch element, the discharging circuit includes a resistor connected with an anode of the first LED strip, and the resistor is grounded through a third switch element.

In the first power supply period of time, controlling the power supply circuit to power the first LED strip in the backlight source includes: in the first power supply period of time, controlling the first switch element to electrically conduct the power supply circuit with the first LED strip, and to disconnect the power supply circuit from the second LED strip, and controlling the second switch element to be turned on, and the third switch element to be turned off.

After the first power supply period of time elapses, disconnecting the first LED strip from the power supply circuit, and controlling the discharging circuit to discharge the first LED strip in the preset period of time includes: in the preset period of time after the first power supply period of time elapses, controlling the first switch element to disconnect the power supply circuit from the first LED strip, to disconnect the power supply circuit from the second LED strip, turning off the second switch element, and turning on the third switch element.

After the preset period of time elapses, controlling the power supply circuit to power the second LED strip in the backlight source includes: after the preset period of time elapses, controlling the first switch element to electrically conduct the power supply circuit with the second LED strip, to disconnect the power supply circuit from the first LED strip, and controlling the second switch element to be turned on, and the third switch element to be turned off.

In some embodiments, the first switch element arranged between the backlight source and the power supply circuit may be a selection switch operable in a multi-access multiplexing mode, or a normal switch, or an MOSFET, or a BJT, etc.; the second switch element may be an MOSFET or a BJT, etc.; and the third switch element may be an MOSFET or a BJT, etc., the embodiments of the disclosure will not be limited thereto.

In some embodiments, the period of time for which the first LED strip is being discharged is the discharging period of time, and the discharging period of time is shorter than or equal to the preset period of time.

The display device according to the embodiments of this disclosure can be a mobile phone, a TV set, a tablet computer, a notebook computer, a digital photo frame, a navigator, or any other product or component with a display function.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A backlight drive circuit, comprising:
a backlight source comprising at least a first LED strip and a second LED strip;
a power supply circuit configured to power the backlight source;
a first switch element arranged between the power supply circuit and the backlight source, wherein the first switch element is configured to control the power supply circuit to power the first LED strip and the second LED strip in a time-division mode;
a second switch element, wherein a first terminal of the second switch element is connected with a cathode of the first LED strip and a cathode of the second LED strip, and a second terminal of the second switch element is grounded, wherein the second switch element is configured to turn on in response to the power supply circuit powering the first LED strip or the second LED strip; and
a discharging circuit connected with an anode of the first LED strip, the discharging circuit comprising a resistor, a third switch element, and a first controller;
wherein an input of the resistor is connected with the anode of the first LED strip, and an output of the resistor is grounded through the third switch element;
wherein a first terminal of the third switch element is connected with the output of the resistor, a second terminal of the third switch element is grounded; and a third terminal of the third switch element is connected with the first controller; and
wherein the first controller is configured to control the third switch element to turn on in response to the second switch element being turned off.

2. The backlight drive circuit according to claim 1, wherein:
the discharging circuit comprises a diode; and
the input of the resistor is connected with at least the anode of the first LED strip through the diode.

3. The backlight drive circuit according to claim 1, wherein:
the resistor is a first resistor and the circuit comprises a second resistor; and
the second resistor has an input connected with an anode of the second LED strip, and an output of the second resistor is grounded.

4. The backlight drive circuit according to claim 1, wherein the discharging circuit further comprises a fourth switch element, and the input of the resistor is connected with at least the anode of the first LED strip through the fourth switch element.

5. A display device, comprising the backlight drive circuit according to claim 1.

6. A backlight driving method, applicable to a display device comprising a backlight source and a power supply circuit, wherein a first switch element is arranged between the backlight source and the power supply circuit, cathodes of a first LED strip in the backlight source and a second LED strip in the backlight source are grounded through a second switch element, a discharging circuit comprises a resistor connected with an anode of the first LED strip, and the resistor is grounded through a third switch element, wherein the backlight driving method comprises:
in a first power supply period of time, controlling the first switch element to electrically connect the power supply circuit with the first LED strip to power the first LED strip in the backlight source and to disconnect the power supply circuit from the second LED strip, turning on the second switch element, and turning off the third switch element;

in a preset period of time after the first power supply period of time elapses, controlling the first switch element to disconnect the first LED strip from the power supply circuit and to disconnect the power supply circuit from the second LED strip, turning off the second switch element, turning on the third switch element, and controlling the discharging circuit to discharge the first LED strip in the preset period of time; and after the preset period of time elapses, controlling the first switch element to electrically connect the power supply circuit with the second LED strip to power the second LED strip in the backlight source and disconnect the power supply circuit from the first LED strip, turning on the second switch element, and turning off the third switch element.

7. The backlight driving method according to claim 6, wherein:

a period of time for which the first LED strip is being discharged is a discharging period of time, and the discharging period of time is shorter than or equal to the preset period of time.

\* \* \* \* \*